(12) United States Patent
Popovici et al.

(10) Patent No.: US 9,064,075 B1
(45) Date of Patent: Jun. 23, 2015

(54) AUTOMATIC ASSIGNMENT OF SIGNALS FOR A FUNCTIONAL MODEL

(75) Inventors: Katalin M. Popovici, Natick, MA (US); Rajiv Ghosh-Roy, Hudson, MA (US); Zhihong Zhao, Newton, MA (US); Hidayet Tunc Simsek, Newton, MA (US); Ramamurthy Mani, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 438 days.

(21) Appl. No.: 13/489,181

(22) Filed: Jun. 5, 2012

Related U.S. Application Data

(63) Continuation-in-part of application No. 12/434,451, filed on May 1, 2009, now Pat. No. 8,204,732, and a continuation-in-part of application No. 12/326,297, filed on Dec. 2, 2008, now Pat. No. 8,387,005.

(51) Int. Cl.
  *G06F 17/50* (2006.01)
  *G06F 9/44* (2006.01)

(52) U.S. Cl.
  CPC .............. *G06F 17/5045* (2013.01); *G06F 8/35* (2013.01); *G06F 17/5068* (2013.01); *G06F 17/5054* (2013.01); *G06F 17/5022* (2013.01)

(58) Field of Classification Search
  CPC ............ G06F 17/5045; G06F 17/5022; G06F 17/5068; G06F 8/34; G06F 8/35
  USPC .......................................................... 703/13
  See application file for complete search history.

(56) References Cited

U.S. PATENT DOCUMENTS

| | | | |
|---|---|---|---|
| 6,219,628 B1 | 4/2001 | Kodosky et al. | |
| 6,606,588 B1 * | 8/2003 | Schaumont et al. | 703/15 |
| 7,145,898 B1 | 12/2006 | Elliott | |
| 7,350,172 B1 | 3/2008 | Koh et al. | |
| 7,363,610 B2 * | 4/2008 | Alfieri | 716/103 |
| 7,503,027 B1 | 3/2009 | Zhao et al. | |
| 7,869,425 B2 | 1/2011 | Elliott et al. | |
| 7,885,902 B1 | 2/2011 | Shoemaker et al. | |
| 7,900,168 B2 | 3/2011 | Chugh et al. | |
| 7,925,490 B2 | 4/2011 | Calvez | |
| 7,974,825 B2 | 7/2011 | Linebarger et al. | |
| 7,983,879 B1 | 7/2011 | Vetsch et al. | |
| 7,987,083 B2 * | 7/2011 | Calvez | 703/13 |
| 7,991,603 B2 | 8/2011 | Calvez | |

(Continued)

OTHER PUBLICATIONS

Abdi et al, "System-on-Chip Environment", SCE Version 2.2.0 Beta, Tutorial, CECS Technical Report #03-41, Jul. 23, 2003.*

(Continued)

*Primary Examiner* — Mary C Jacob
(74) *Attorney, Agent, or Firm* — Harrity & Harrity, LLP

(57) ABSTRACT

A device receives information associated with a functional model, and generates the functional model based on the received information and with a technical computing environment (TCE), where the functional model including nodes, inputs, and outputs. The device also automatically detects architecture information from an architecture model associated with the functional model, and automatically assigns, based on the architecture information, at least one signal between two nodes of the functional model, a node and an input of the functional model, or a node and an output of the functional model. The device obtains information for code generation based on the assigned at least one signal, and stores the information for code generation.

44 Claims, 23 Drawing Sheets

(56) References Cited

U.S. PATENT DOCUMENTS

| | | |
|---|---|---|
| 8,015,543 B1 | 9/2011 | Carrick et al. |
| 8,046,202 B1 | 10/2011 | Yang et al. |
| 8,141,011 B1 | 3/2012 | Zhao et al. |
| 8,156,481 B1 | 4/2012 | Koh et al. |
| 8,204,732 B1 | 6/2012 | Simsek et al. |
| 2004/0133861 A1 | 7/2004 | Bollano et al. |
| 2006/0282252 A1* | 12/2006 | Ciolfi .............................. 703/22 |
| 2008/0004851 A1 | 1/2008 | Calvez |
| 2008/0243464 A1 | 10/2008 | Calvez |

OTHER PUBLICATIONS

Popovici et al, "Simulink Based Hardware-Software Codesign Flow for Heterogeneous MPSoC", Summer Computer Simulation Conference, Jul. 15-18, 2007.*

Domer et al, "System-on-Chip Environment: A SpecC-Based Framework for Heterogeneous MPSoC Design", EURASIP Journal on Embedded Systems, vol. 2008, accepted Jun. 10, 2008.*

Atat et al, "Simulink-Based MOSoC Design: New Approach to Bridge the Gap Between Algorithm and Architecture Design", IEEE Computer Society Annual Symposium on VLSI, 2007.*

Nicolescu et al, "Validation in a Component-Based Design Flow for Multicore SoCs", ISSS'02, Oct. 2-4, 2002.*

Nikolov et al, "Multi-processor System Design with ESPAM", Codes+ISSS'06, Oct. 22-25, 2006.*

Zergainoh et al, "IP-Block-based Design Environment for High-Throughput VLSI Dedicated Digital Signal Processing Systems", ASP-DAC, IEEE, 2005.*

Canfora et al, Recovering the Architectural Design for Software Comprehension, IEEE Third Workshop on Program Comprehension, 1994, pp. 30-38.

The MathWorks, Inc., "Real-Time Workshop® 6: User Guide", Mar. 2007, 857 pages.

The MathWorks, Inc., "Simulink® HDL Coder™ 1: User's Guide", Mar. 2008, 552 pages.

The MathWorks, Inc. "xPC Target 3: User's Guide", Sep. 2007, 477 pages.

Co-pending U.S. Appl. No. 12/326,297 entitled "Generation of Multi-Domain Code from a Graphical Program", by Roy et al., Dec. 2, 2008, 49 pages.

* cited by examiner

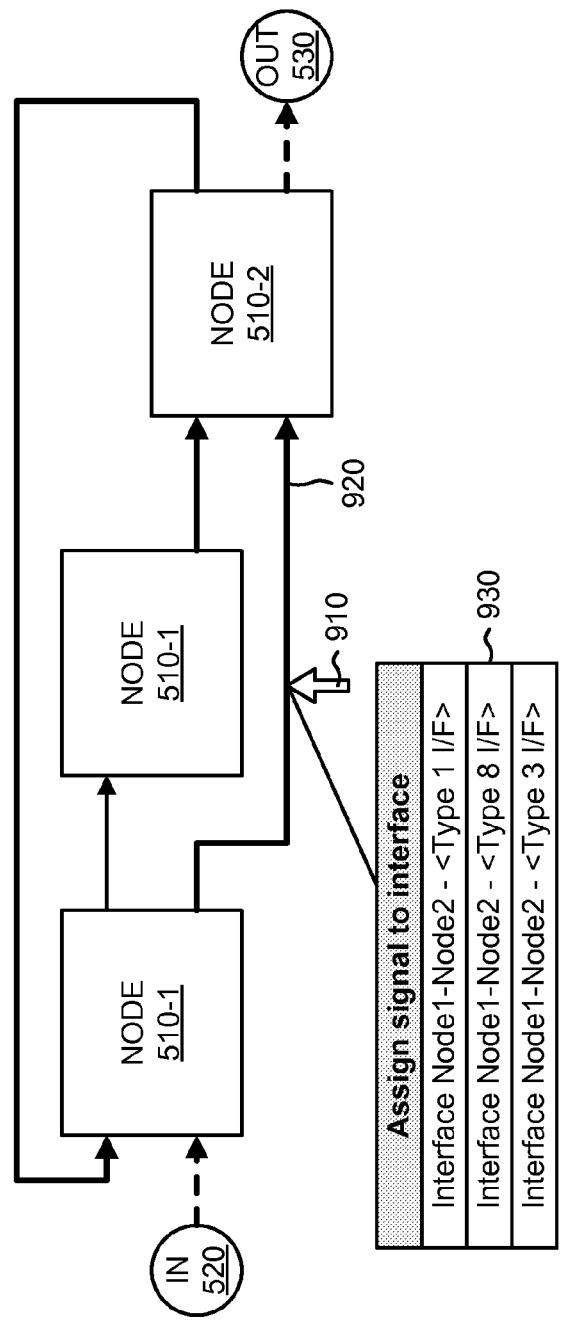

FIG. 10A

```
/* Timing bridge */
rtTimingBridge timingBridge[2];

/* Output for Task: Periodic_Task2 */ ...;
```
→ Generate C code for blocks mapped to node (1020)

```
/* S-Function (amdxfpgaread): '<Root>/TmpS-FunctionAtInvertorandMotorInport3' */
{
  uint32_T iter = 0;
  ((uint32_T *)&normdl_mapped_B.TmpSFunctionAtInvertorandMotorI)[iter] =
    ((uint32_T *)normdl_mapped_DWork.TmpSFunctionAtInvertorandMotorI.PCI_ADDR)
    [iter];
}
/* S-Function (amdxfpgaread): '<Root>/TmpS-FunctionAtInvertorandMotor4' */
{
  uint32_T iter = 0;
  ((uint32_T *)&normdl_mapped_B.TmpSFunctionAtInvertorandMoto_h)[iter] =
    ((uint32_T *)normdl_mapped_DWork.TmpSFunctionAtInvertorandMoto_m.PCI_ADDR)
    [iter];
}
/* ModelReference: '<Root>/Invertor and Motor' */
```
→ Device drivers automatically inserted in task functions (1030)

```
/* S-Function (amdxfpgawrite): '<Root>/rtComponent_Invertor and Motor' */
{
  uint32_T iter = 0;
  ((uint32_T *)normdl_mapped_DWork.TmpSFunctionAtInvertorandMotorO.PCI_ADDR)
    [iter] = ((uint32_T *)&normdl_mapped_B.la)[iter];
}
```

FIG. 10B

```
/* S-Function (amdxfpgawrite): '<Root>/rtComponent_Invertor and Motor' */ ...

/* Update for Task: Periodic_Task2 */          /* Sample time: [7.5E-5s, 0.0s] */ ...
void Periodic_Task2_update(void)

/* Output for Task: Periodic_Task3 */          /* Sample time: [7.5E-5s, 0.0s] */ ...
void Periodic_Task3_output(void)

/* Update for Task: Periodic_Task3 */          /* Sample time: [7.5E-5s, 0.0s] */ ...
void Periodic_Task3_update(void)

/* Model initialize function */
void normdl_mapped_initialize(void) ...
/*------- S-Function Block: <Root>/S-Function FPGA load --------*/
    int_T status;
    char_T *errMsg;
    uint32_T sm, rm;
    status = xPCFpgaInit(0, 0, -1, 301, 1,
                  IP1K1X0_0, (unsigned int)IP1K1X0_0_sz);
    if (status == -1) {
        errMsg = "FPGA board not present at: device index 0";
        rtmSetErrorStatus(normdl_mapped_rtM, errMsg);
        return;
    } else if (status == -2) {
        errMsg = "Bitstream not loaded for FPGA board at: device index 0";
        rtmSetErrorStatus(normdl_mapped_rtM, errMsg);
        return;
```

Task functions (1040)

Board setup code automatically inserted for each hardware node (1050)

FIG. 10C

```
/* Start for S-Function (amdxfpgaread): '<Root>/rtComponent_Invertor and Motor' */
{
    uint8_T *baseaddr;
    uint8_T *plxaddr;
    uint32_T dmabuffer;
    baseaddr = (uint8_T *)xPCFpgaGetAddress( 0, 2 );
    normdl_mapped_DWork.TmpSFunctionAtInvertorandMoto_k.PCI_ADDR = (void *)
        (baseaddr + 33344);
    plxaddr = (uint8_T *)xPCFpgaGetAddress( 0, 0 ) + 0x80;
```
← Device drivers initialize code (1060)

```
* * *
/* Model terminate function */
void normdl_mapped_terminate(void)
/* Terminate for S-Function (amdxfpgasetup): '<Root>/S-Function' */
{
    volatile uint8_T *pciPtr;
    int_T barIndex= 2;
    pciPtr = xPCFpgaGetAddress (0, barIndex);
    ((uint32_T *)(pciPtr+0x80C0))[0] = 0;
```
← Device drivers and board setup terminate code (1070)

```
/* Terminate for S-Function (amdxfpgaread): '<Root>/rtComponent_Invertor and Motor' */
{
    void *dmabuffer = (void *)
        normdl_mapped_DWork.TmpSFunctionAtInvertorandMoto_k.DMA_ADDR;
    if (dmabuffer != NULL)
        xpcFreePhysicalMemory( dmabuffer );
* * *
```

```
ENTITY controller_topio301_pci_decoder IS
PORT( clk             : IN   std_logic;
     reset            : IN   std_logic;
     enb              : IN   std_logic;
     data_write       : IN   std_logic_vector(31 DOWNTO 0);  -- ufix32
     addr_sel         : IN   std_logic_vector(17 DOWNTO 0);  -- ufix18
     wr_enb           : IN   std_logic;  -- ufix1
     rd_enb           : IN   std_logic;  -- ufix1
     read_Out3        : IN   std_logic_vector(31 DOWNTO 0);  -- ufix32
     read_Out4        : IN   std_logic_vector(31 DOWNTO 0);  -- ufix32
     read_Out5        : IN   std_logic_vector(31 DOWNTO 0);  -- ufix32
     read_Out6        : IN   std_logic_vector(31 DOWNTO 0);  -- ufix32
     read_Out7        : IN   std_logic_vector(31 DOWNTO 0);  -- ufix32
     read_Out8        : IN   std_logic_vector(31 DOWNTO 0);  -- ufix32
     read_Out1        : IN   std_logic_vector(31 DOWNTO 0);  -- ufix32
     read_Out2        : IN   std_logic_vector(31 DOWNTO 0);  -- ufix32
     data_read        : OUT  std_logic_vector(31 DOWNTO 0);  -- ufix32
     write_pci_enable : OUT  std_logic;  -- ufix1
     write_In1        : OUT  std_logic_vector(31 DOWNTO 0);  -- ufix32
     write_In2        : OUT  std_logic_vector(31 DOWNTO 0);  -- ufix32
     write_In3        : OUT  std_logic_vector(31 DOWNTO 0);  -- ufix32
     write_In4        : OUT  std_logic_vector(31 DOWNTO 0);  -- ufix32
     write_In5        : OUT  std_logic_vector(31 DOWNTO 0);  -- ufix32
     write_In6        : OUT  std_logic_vector(31 DOWNTO 0);  -- ufix32
     write_In7        : OUT  std_logic_vector(31 DOWNTO 0);  -- ufix32
     );
END controller_topio301_pci_decoder;
```

1110

VHDL code for PCI decoder (1120)

```
ARCHITECTURE rtl OF controller_topio301_pci_decoder IS

-- Signals
SIGNAL addr_sel_unsigned          : unsigned(17 DOWNTO 0); -- ufix18
***
BEGIN
  addr_sel_unsigned <= unsigned(addr_sel);
  decode_sel_Out3 <= '1' WHEN addr_sel_unsigned = 8323 ELSE
    '0';
  const_z <= (OTHERS => 'Z');
  read_Out3_unsigned <= unsigned(read_Out3);
  decode_sel_Out4 <= '1' WHEN addr_sel_unsigned = 8324 ELSE
    '0';

reg_Out3_process : PROCESS (clk, reset)
  BEGIN
    IF reset = '1' THEN
      read_reg_Out3 <= to_unsigned(0, 32);
    ELSIF clk'EVENT AND clk = '1' THEN
      IF enb = '1' THEN
        read_reg_Out3 <= read_Out3_unsigned;
      END IF;
    END IF;
  END PROCESS reg_Out3_process;
***
```

Generated address in the PCI decoder source file (1130)

FIG. 11C

```
reg_Out4_process : PROCESS (clk, reset)
BEGIN
    IF reset = '1' THEN
        read_reg_Out4 <= to_unsigned(0, 32);
    ELSIF clk'EVENT AND clk = '1' THEN
        IF enb = '1' THEN
            read_reg_Out4 <= read_Out4_unsigned;
        END IF;
    END IF;
END PROCESS reg_Out4_process;
...
decode_sel_In7 <= '1' WHEN addr_sel_unsigned = 8335 ELSE
    '0';
reg_enb_In7 <= decode_sel_In7 AND wr_enb;

reg_In7_process : PROCESS (clk, reset)
BEGIN
    IF reset = '1' THEN
        write_reg_In7 <= to_unsigned(0, 32);
    ELSIF clk'EVENT AND clk = '1' THEN
        IF enb = '1' AND reg_enb_In7 = '1' THEN
            write_reg_In7 <= data_write_unsigned;
        END IF;
    END IF;
END PROCESS reg_In7_process;
write_In7 <= std_logic_vector(write_reg_In7);
END rtl;
```

Generate addresses in the PCI decoder source file (1140)

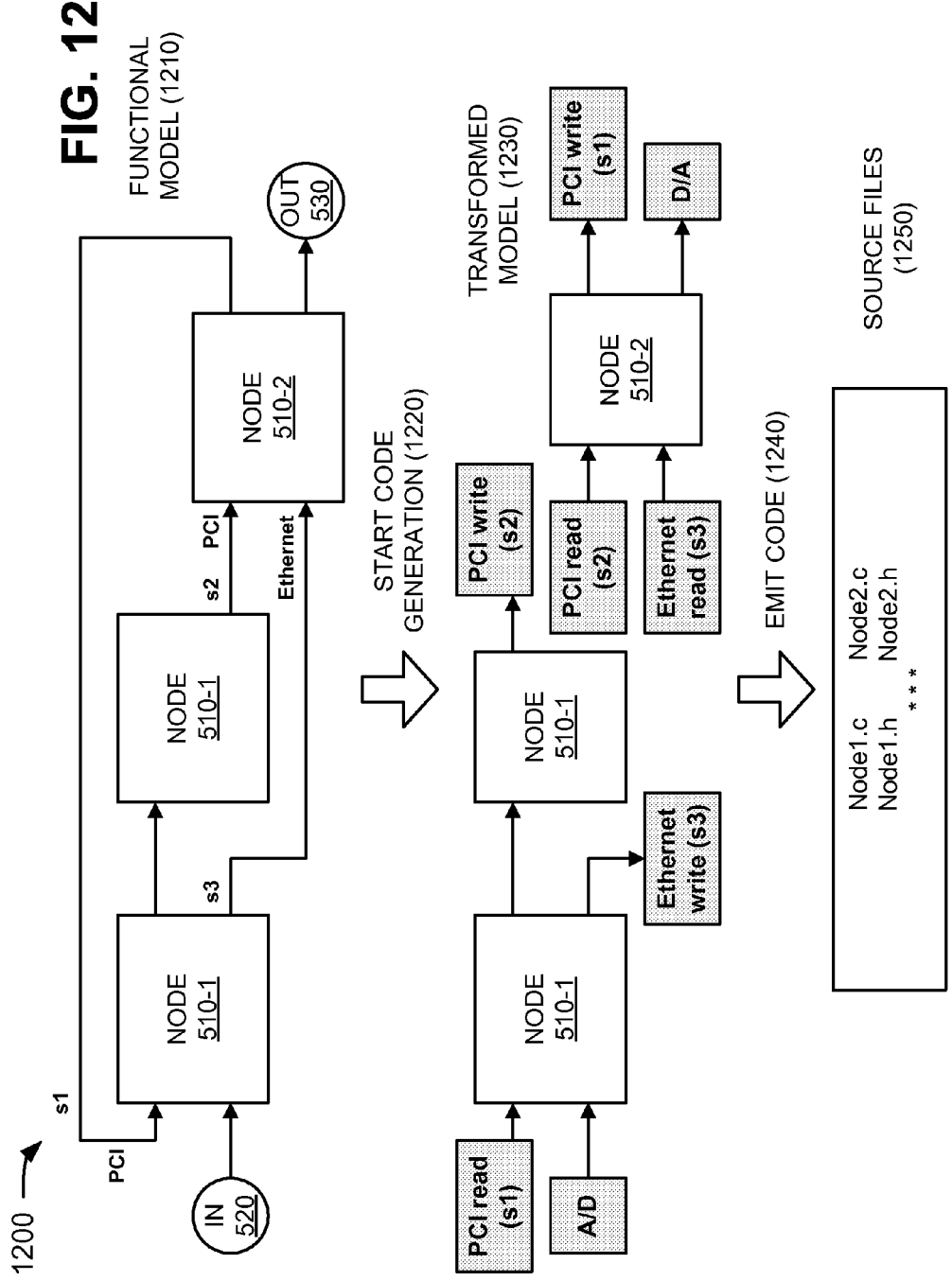

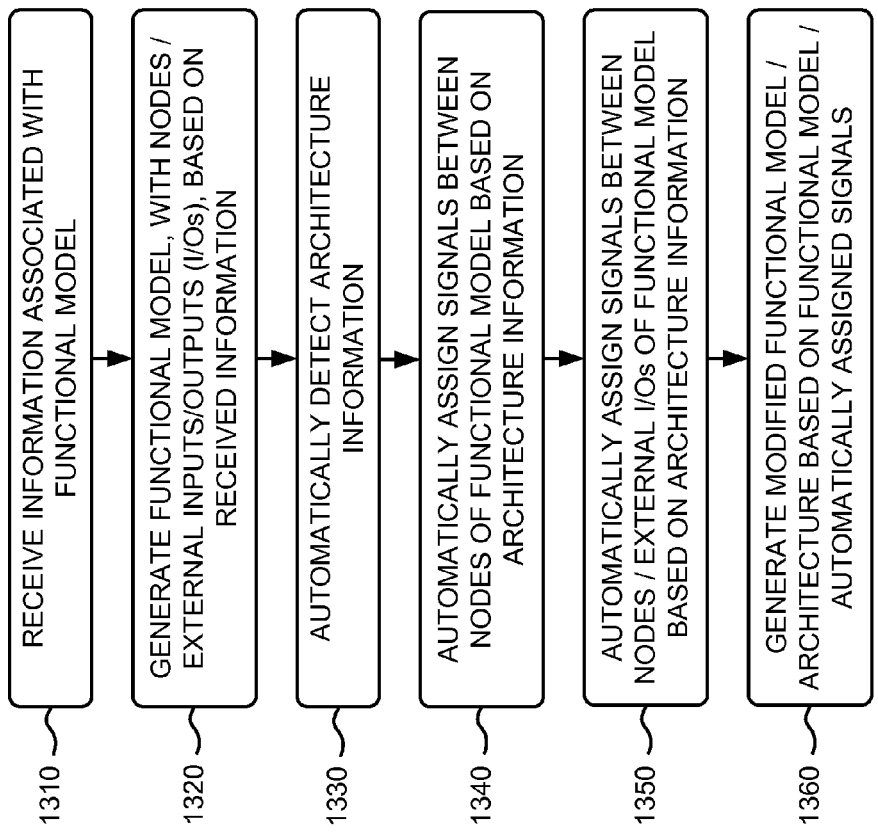

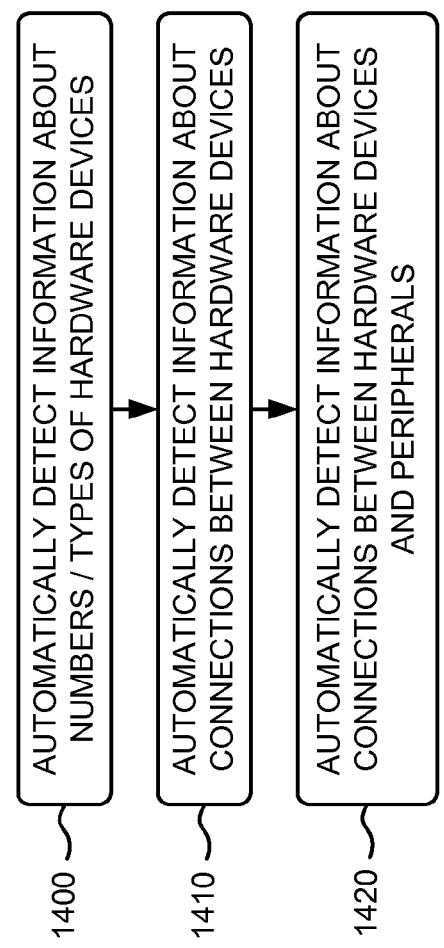

AUTOMATIC ASSIGNMENT OF SIGNALS FOR A FUNCTIONAL MODEL

RELATED APPLICATION

This application is a continuation-in-part of U.S. patent application Ser. No. 12/434,451, filed May 1, 2009 (now U.S. Pat. No. 8,204,732), and of U.S. patent application Ser. No. 12/326,297, filed Dec. 2, 2008 (now U.S. Pat. No. 8,387,005), the disclosures of which are incorporated by reference herein in their entireties.

BACKGROUND

In certain applications, engineers may wish to simulate a system (e.g., a communication system) prior to constructing the actual system. Simulations may allow engineers to model aspects of the system before expending time, money, and other resources to actually construct the system. For example, an engineer may use a computing environment to create, for the system, a functional model (e.g., an algorithmic model) that includes nodes and/or external inputs/outputs. The nodes of the functional model may represent one or more hardware devices (e.g., a central processing unit (CPU), a graphical processing unit (GPU), a field-programmable gate array (FPGA), an application-specific integrated circuit (ASIC), etc.) of an architecture model. The external inputs/outputs of the functional model may represent one or more peripheral devices (e.g., analog-to-digital (A/D) inputs, digital-to-analog (D/A) outputs, etc.) of the architecture model.

The engineer manually assigns the nodes (or blocks mapped to architectural elements) of the functional model to the hardware devices of the architecture model, and manually assigns the external inputs/outputs of the functional model to the peripheral devices of the architecture model. The engineer also manually assigns signals, between the nodes (or blocks mapped to architectural elements) of the functional model, to connections (e.g., communication interfaces and/or channels) provided between the hardware devices of the architecture model. The engineer manually assigns signals, between the nodes (or blocks mapped to architectural elements) and external inputs/outputs of the functional model, to connections provided between the hardware devices and the peripheral devices of the architecture model. However, manual assignment of such signals is both cumbersome and time consuming for the engineer.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 9 is a diagram of another example user interface, for enabling modification of signals, that may be generated by the TCE;

FIGS. 10A-10C are diagrams depicting an example of automatically generated code for automatically assigned signals in a functional model;

FIGS. 11A-11C are diagrams depicting another example of automatically generated code for automatically assigned signals in a functional model;

FIG. 12 is a diagram depicting modification of a functional model based on automatically assigned signals and generation of code for the modified functional model; and FIGS. 13-19 are flow charts of an example process for automatically assigning signals of a functional model according to an implementation described herein.

DETAILED DESCRIPTION

The following detailed description refers to the accompanying drawings. The same reference numbers in different drawings may identify the same or similar elements. Also, the following detailed description does not limit the invention.

Overview

Figure 1:
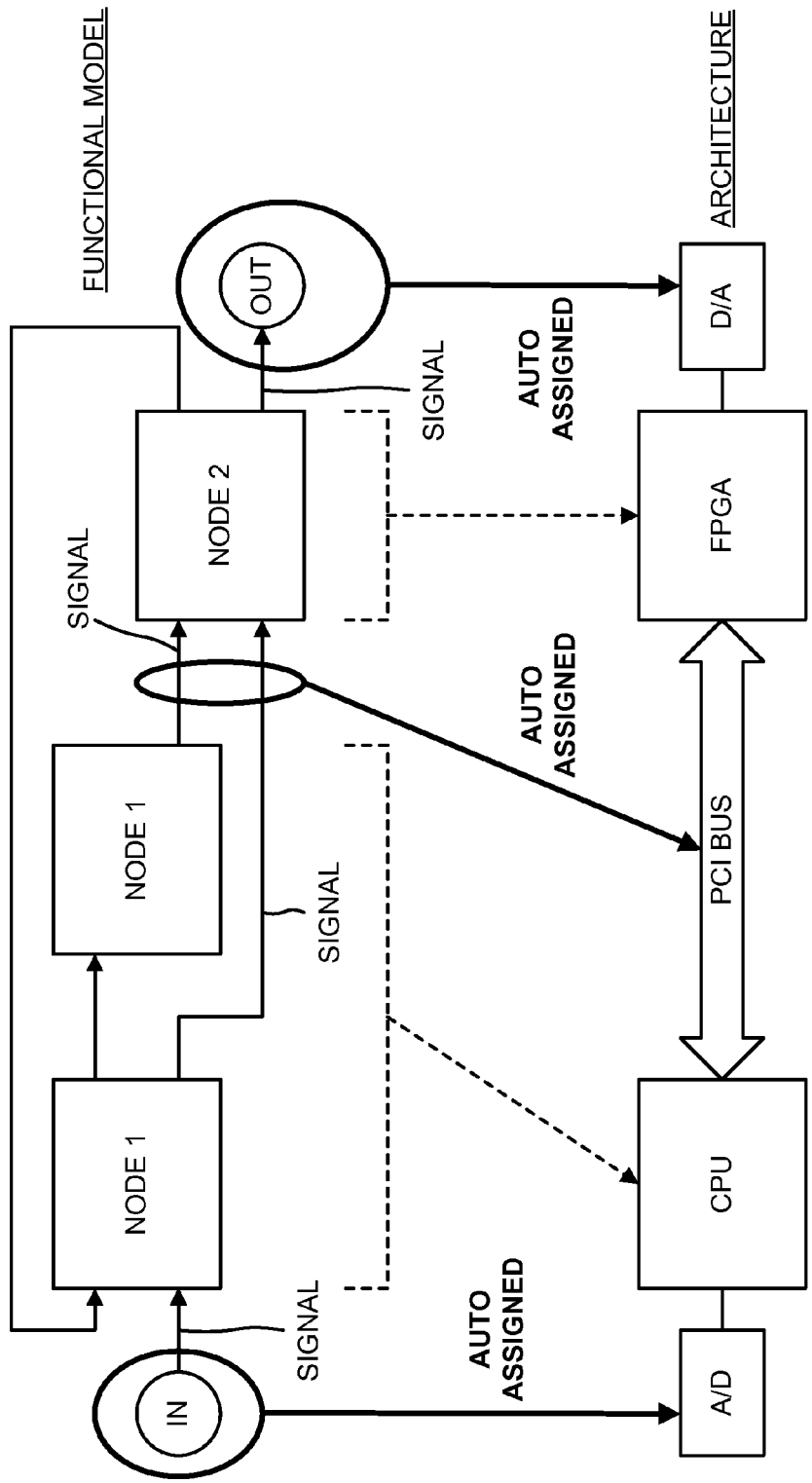
FIG. 1 is a diagram of an overview of an example implementation described herein.

Systems and/or methods described herein may automatically assign signals between nodes (or blocks mapped to architectural elements) and between nodes (or blocks mapped to architectural elements) and external inputs/outputs of a functional model created with a technical computing environment (TCE). The systems and/or methods may enable signals to be quickly and easily assigned so that the functional model may be deployed in an efficient manner. FIG. 1 is a diagram of an overview of an example implementation described herein. As shown in FIG. 1, a functional model may be provided (e.g., by a TCE) and may be associated with an architecture model. In one example, the functional model may include an algorithmic model, a block diagram model, etc. produced by the TCE. The functional model may include a first node (e.g., Node 1), a second node (e.g., Node 2), an external input (e.g., In), and an external output (e.g., Out). The architecture model may include a first hardware device (e.g., a CPU) and a second hardware device (e.g., a FPGA). In one example, the architecture model may include an architecture of hardware devices and connections. The architecture may be homogeneous when the hardware devices are of the same type (e.g., all CPUs), or may be heterogeneous when the hardware devices are of different types (e.g., some CPUs, some FPGAs, etc.).

The first node may include a representation (e.g., a block) of a hardware device of the architecture model. A block may include a fundamental mathematical element of a block diagram model. In one example, the first node may be represented by two blocks and may be manually assigned to the first hardware device (e.g., the CPU), as indicated by the dashed lines. Thus, the first node may be a representation of the first hardware device. The second node may include a representation (e.g., a block) of a hardware device of the architecture model. In one example, the second node may be manually assigned to the second hardware device (e.g., the FPGA), as indicated by the dashed lines. Thus, the second node may be a representation of the second hardware device.

The external input may include a representation (e.g., a block) of a peripheral device of the architecture model. The external output may include a representation (e.g., a block) of a peripheral device of the architecture model.

The first hardware device may include one or more CPUs, processors, microprocessors, or other types of processing units that may interpret and execute instructions. The second hardware device may include programmable logic, such as one or more FPGAs, ASICs, etc.

As further shown in FIG. 1, one or more signals may be provided between the first node and the second node. One or more signals may also be provided between the external input and the first node, and between the second node and the external output. A signal may be either a scalar signal, a vector signal, or a compound signal. A signal may include scalar or vector values, an array of values, structured data types, multiple data types, a hierarchical data type, etc. In one example implementation, the TCE may automatically detect architecture information associated with the first hardware device and the second hardware device. The architecture information may include information about types of hardware devices available for the architecture model, information about connections between the first hardware device and the second hardware device, and information about connections between the first and second hardware devices and the peripheral devices available for the architecture model.

Based on the architecture information, the TCE may automatically assign the signals provided between the first node and the second node. For example, as shown in FIG. 1, the TCE may automatically assign the signals, provided between the first and second nodes, to particular communication interfaces (e.g., Peripheral Component Interconnect (PCI) interfaces) and a particular channel (e.g., a PCI bus). A PCI interface may be provided on each of the first hardware device (e.g., the CPU) and the second hardware device (e.g., the FPGA). The PCI bus may be provided between the first hardware device and the second hardware device. The CPU and the FPGA may communicate with one another via the PCI interfaces and the PCI bus. The TCE may also automatically configure the particular communication interfaces and the particular channel based on the architecture information.

Based on the architecture information, the TCE may automatically assign the signal provided between the first node and the external input, and may automatically assign the signal provided between the second node and the external output. For example, as shown in FIG. 1, the TCE may automatically assign the signal, provided between the first node and the external input, to a particular peripheral device (e.g., an A/D input). The TCE may also automatically configure the A/D input to communicate with the CPU. The TCE may automatically assign the signal, provided between the second node and the external output, to a particular peripheral device (e.g., a D/A output). The TCE may also automatically configure the D/A output to communicate with the FPGA.

Based on the assignment of the signals, the TCE may obtain information for generating code to modify the functional model. The information may include information about the communication interfaces, the channels, the peripheral devices, and/or the configurations of the communication interfaces, the channels, and/or the peripheral devices. The TCE may utilize the information to modify the functional model so that the functional model takes into account the automatically assigned signals. Alternatively, or additionally, the TCE may store the information for future use.

In one example, the nodes of the functional model may include one or more blocks from a block diagram model. Alternatively, or additionally, one or more nodes of the functional model may be omitted and one or more blocks of a block diagram model may be used in place of the omitted nodes. If architectural elements (e.g., CPUs, channels, interfaces, etc.) are known at the time of mapping the functional model to the architecture model, the TCE may assign one or more blocks of the functional model directly to the architectural elements without the use of nodes. If the architectural elements are not known at the time of mapping the functional model to the architecture model, the user may map the blocks to nodes (e.g., one or more blocks may be mapped to a single node). The nodes may be abstract in a sense that their type may be unknown. When the architectural elements become known, the node may be assigned to particular architectural elements (e.g., Node 1 may be assigned to the CPU, etc.). Additionally, or alternatively, nodes may be inferred from blocks that are directly assigned to the architectural elements.

The term "code," as used herein, is to be broadly interpreted to include text-based code that may require further processing to execute (e.g., C++ code, Hardware Description Language (HDL) code, VHDL code, Verilog, Java, and/or other types of hardware or software based code that may be compiled and/or synthesized); binary code that may be executed (e.g., executable files that may directly be executed by an operating system, bitstream files that can be used to configure a FPGS, Java byte code, object files combined together with linker directives, source code, make files, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.).

Example Environment Arrangement

Figure 2:
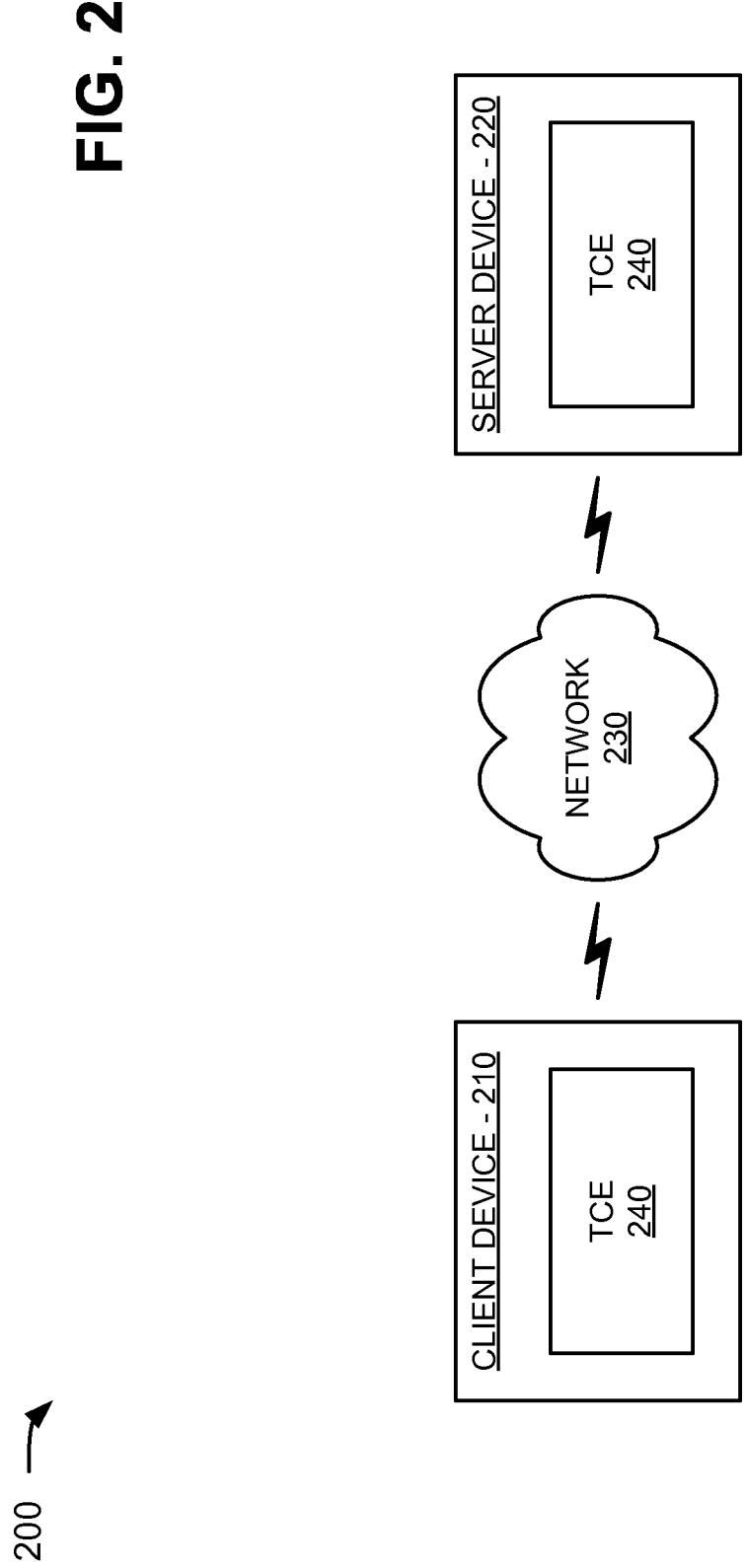
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

In one example implementation, client device 210 may receive information associated with a functional model to be created using a TCE 240 (e.g., at least partially provided in client device 210 and/or server device 220). Client device 210 may generate the functional model, based on the received information and with TCE 240. In one example, the functional model may include a block diagram model of nodes, inputs, and/or outputs. Client device 210 may automatically detect architecture information associated with the functional model. In one example, client device 210 may automatically detect the architecture information from a target (e.g., a hardware board) connected to client device 210. The architecture information may include information about hardware devices available for the functional model, such as a number of hardware devices and types of hardware devices (e.g., CPUs, ASICs, FPGAs, etc.) available for the functional model. The architecture information may include information about connections between two hardware devices, such as types of communication interfaces (e.g., PCI interfaces) and/or channels (e.g., a PCI bus and slot number) that may be provided between the two hardware devices. The architecture information may include information about connections between hardware devices and peripheral devices available for the functional model, such as types of communication interfaces (e.g., A/D or D/A interfaces) and/or channels (e.g., a number of channels in an A/D or D/A device, an address of a memory mapped device, etc.) that may be provided between the hardware devices and the peripheral devices.

Client device 210 may automatically assign, based on the architecture information, signals between two nodes of the functional model, a signal between a node and an input of the functional model, and/or a signal between a node and an output of the functional model. Client device 210 may obtain information for code generation based on the assigned signals. The information for code generation may include information used to modify code for the functional model so that the automatically assigned signals are incorporated into the functional model. Client device 210 may utilize the information for code generation to modify the code for the functional model. Alternatively, or additionally, client device 210 may store the information for code generation in a computer-readable medium associated with client device 210.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, CPUs, GPUs, FPGAs, ASICs, etc. and/or software (e.g., a simulator) executing on the aforementioned devices. In one example, server device 220 may include TCE 240 and may perform some or all of the functionality described above for client device 210. Alternatively, server device 220 may be omitted and client device 210 may perform all of the functionality described above for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations. For example, TCE 240 may use an array as a basic element, where the array may not require dimensioning. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
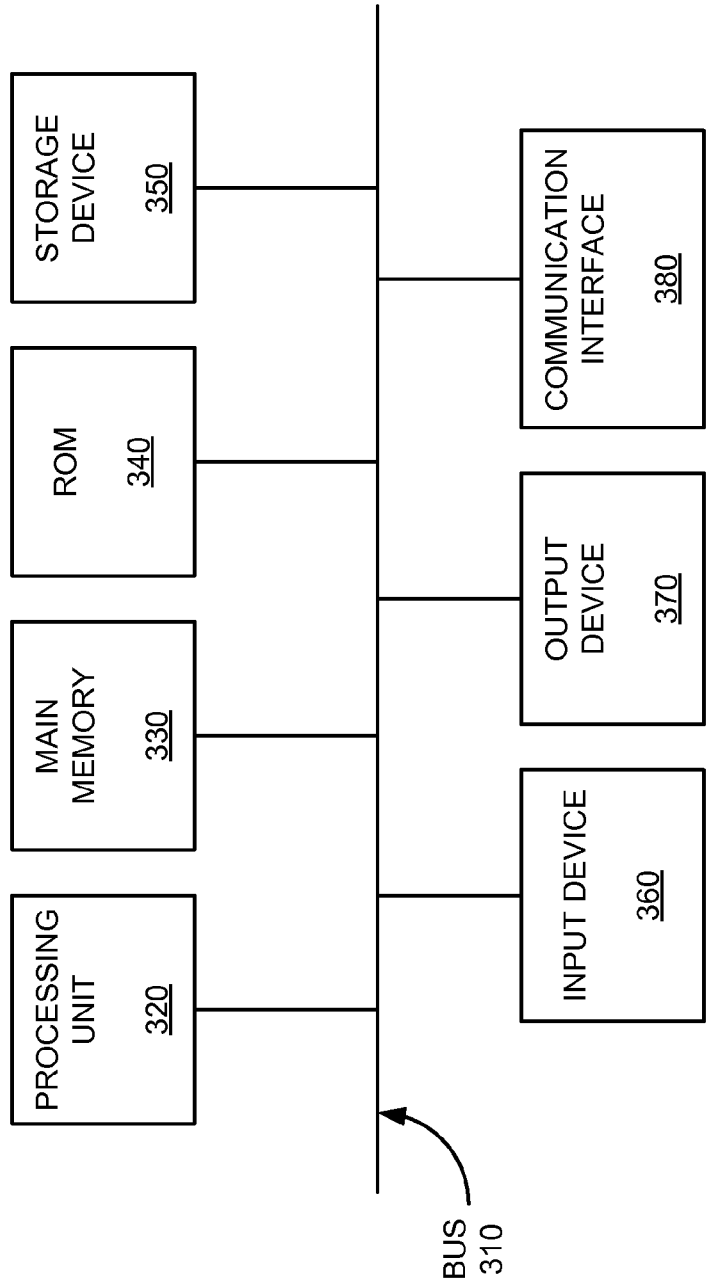
FIG. 3 is a diagram of example components of one or more of the devices of the network depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
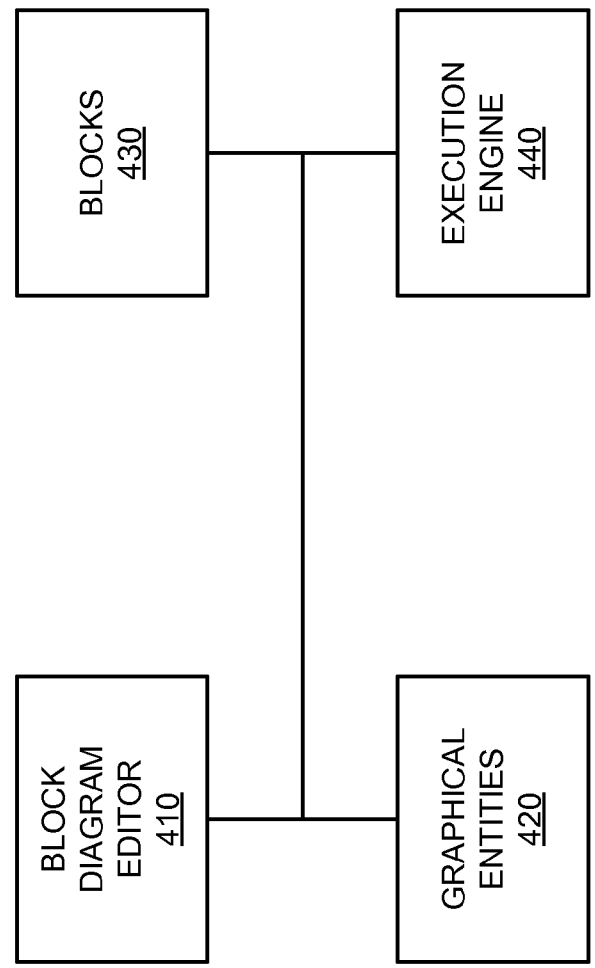
FIG. 4 is a diagram of example functional components of a technical computing environment (TCE) that may be used by one or more of the devices of the network depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system), such as a functional model. In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model, such as the functional model depicted in FIG. 1.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models (e.g., a functional model) may include entities with relationships between the entities, and the relationships and/or the entities may have attributes associated with them. The entities my include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model (e.g., a functional model 510). For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
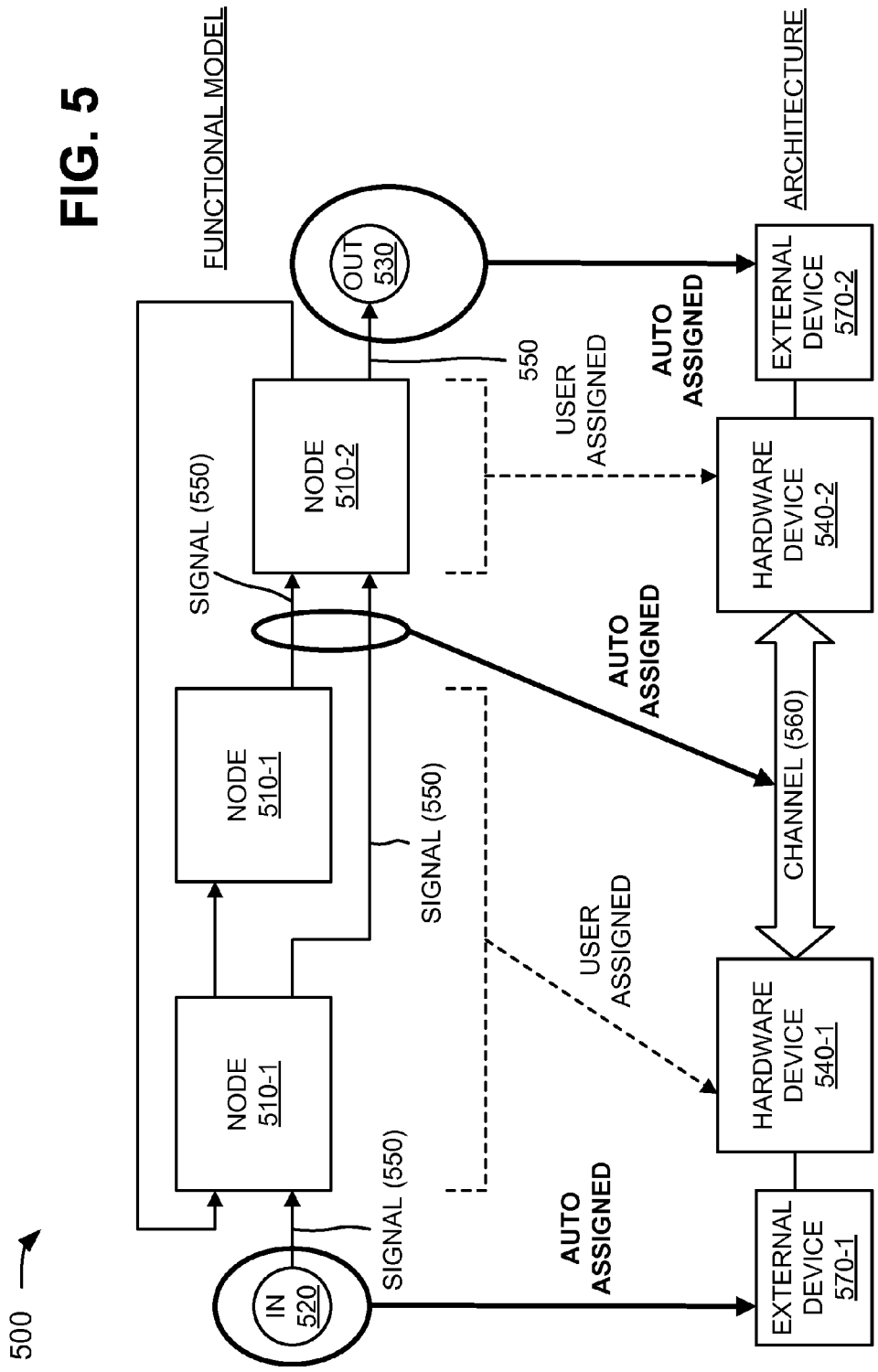
FIG. 5 is a diagram of an overview of example interactions between a functional model and an architecture model capable of being generated by the TCE.

FIG. 5 is a diagram of an overview 500 of example interactions between a functional model and an architecture model capable of being generated by TCE 240 (FIGS. 2 and 4). As illustrated, a functional model may be provided (e.g., by TCE 240) and may be associated with an architecture model. TCE 240 may receive, from a user, information associated with the functional model (e.g., nodes, inputs/outputs, signals, etc.), and may generate the functional model based on the received information. In one example, the functional model may include an algorithmic model, a block diagram model, etc. produced by TCE 240. The functional model may include a first node 510-1 (e.g., represented by two blocks), a second node 510-2, an external input 520, and an external output 530. The architecture model may include a first hardware device 540-1 and a second hardware device 540-2. In one example, the architecture model may include an architecture of hardware devices and connections. The architecture may be homogeneous when the hardware devices are of the same type (e.g., all CPUs, all ASICs, etc.), or may be heterogeneous when the hardware devices are of different types (e.g., some CPUs, some FPGAs, etc.).

First node 510-1 may include a representation (e.g., a block) of a hardware device of the architecture model. In one example, first node 510-1 may be manually assigned (e.g., by a user of client device 210) to first hardware device 540-1, as indicated by the dashed lines. Thus, first node 510-1 may be a representation of first hardware device 540-1. Second node 510-2 may include a representation (e.g., a block) of a hardware device of the architecture model. In one example, second node 510-2 may be manually assigned (e.g., by the user) to second hardware device 540-2, as indicated by the dashed lines. Thus, second node 510-2 may be a representation of second hardware device 540-2.

External input 520 may include a representation (e.g., a block) of a peripheral device of the architecture model. External output 530 may include a representation (e.g., a block) of a peripheral device of the architecture model.

First hardware device 510-1 may include one or more CPUs, processors, microprocessors, other types of processing units that may interpret and execute instructions, programmable logic (e.g., FPGAs, ASICs, etc.), etc. Second hardware device 510-2 may include one or more CPUs, processors, microprocessors, other types of processing units that may interpret and execute instructions, programmable logic (e.g., FPGAs, ASICs, etc.), etc.

As further shown in FIG. 5, one or more signals 550 may be provided between first node 510-1 and second node 510-2. One or more signals 550 may also be provided between external input 520 and first node 510-1, and between second node 510-2 and external output 530. Signal 550 may be either a scalar signal or a vector signal. Signal 550 may include scalar or vector values, an array of values, structured data types, multiple data types, a hierarchical data type, etc. In one example implementation, TCE 240 may automatically detect architecture information associated with first hardware device 540-1 and second hardware device 540-2. The architecture information may include information about numbers and/or types of hardware devices 540 available for the architecture model, information about connections between first hardware device 540-1 and second hardware device 540-2, and information about connections between first and second hardware devices 540-1/540-2 and peripheral devices available for the architecture model.

Based on the architecture information, TCE 240 may automatically assign signals 550 provided between first node 510-1 and second node 510-2. For example, as shown in FIG. 5, TCE 240 may automatically assign signals 550, provided between first node 510-1 and second node 510-2, to particular communication interfaces (e.g., PCI interfaces) and a particular communication channel 560 (e.g., a PCI bus). A communication interface (e.g., a PCI interface) may be provided on each of first hardware device 540-1 and second hardware device 540-2. Communication channel 560 (e.g., the PCI bus) may be provided between first hardware device 540-1 and second hardware device 540-2. First hardware device 540-1 and second hardware device 540-2 may communicate with one another via the communication interfaces and communication channel 560. TCE 240 may also automatically configure properties of the communication interfaces and communication channel 560 based on the architecture information. For example, TCE 240 may allocate a PCI bus number, slot number, and address to the communication interfaces and communication channel 560.

Based on the architecture information, TCE 240 may automatically assign signal 550 provided between first node 510-1 and external input 520, and may automatically assign signal 550 provided between second node 510-2 and external output 530. For example, as shown in FIG. 5, TCE may automatically assign signal 550, provided between first node 510-1 and external input 520, to a first peripheral or external device 570-1 (e.g., an A/D input). TCE 240 may also automatically configure first external device 570-1 to communicate with first hardware device 540-1. TCE 240 may automatically assign signal 550, provided between second node 510-2 and external output 530, to a second peripheral or external device 570-2 (e.g., a D/A output). TCE 240 may also automatically configure second external device 570-2 to communicate with second hardware device 540-2. In one example, TCE 240 may automatically configure properties of first external device 570-1 and second external device 570-2 based on the architecture information. For example, TCE 240 may allocate a number of channels in the A/D input or the D/A output. In one example implementation, external devices 570-1 and 570-2 may represent other type of input/output devices, such as, for example, digital inputs, digital outputs, pulse width modulation-based inputs and outputs, messages sent using a protocol (e.g., RS-232, Ethernet, Controller Area Network (CAN), EtherCAT, etc. protocols), etc.

In one example implementation, TCE 240 may automatically assign signals 550 based on one or more rules. A rule may be specified by a user of TCE 240 as a user constraint and/or may be determined by the architecture model as an architecture constraint. An example of a user constraint may include a rule specifying: that signals between a first node (e.g., first node 510-1) and a second node (e.g., second node 510-2) of a functional model should be assigned to a particular type of communication channel (e.g., a PCI bus); and that signals between the first node and a third node of the functional model should be assigned to another type of communication channel (e.g., Ethernet). An example of an architecture constraint may include a rule specifying that if a data rate of a signal is too large (e.g., greater than 100 megabits per second), the signal should not be assigned to a particular communication channel (e.g., an Ethernet interface) due to exceeding the communication bandwidth of the Ethernet interface, which may result in poor overall system performance.

Based on the assignment of signals 550, TCE 240 may obtain information that may be used to generate code that modifies the functional model. The information may include information about the communication interfaces, the channels (e.g., communication channel 560), the peripheral devices (e.g., external devices 570-1 and 570-2), and/or the configurations of the communication interfaces, the channels, and/or the peripheral devices. TCE 240 may utilize the information to automatically generate code to be inserted in the code for the functional model. The inserted code may modify the functional model so that the functional model takes into account the automatically assigned signals 550. Alternatively, or additionally, TCE 240 may store the information for future use (e.g., in a memory associated with client device 210 and/or server device 220). Further details of code generation are provided below in connection with FIGS. 10A-11C.

Although FIG. 5 shows example components of overview 500, in other implementations, overview 500 may include fewer components, different components, differently arranged components, and/or additional components than depicted in FIG. 5. Alternatively, or additionally, one or more components of overview 500 may perform one or more other tasks described as being performed by one or more other components of overview 500.

Example Functional Components of Technical
Computing Environment

Figure 6:
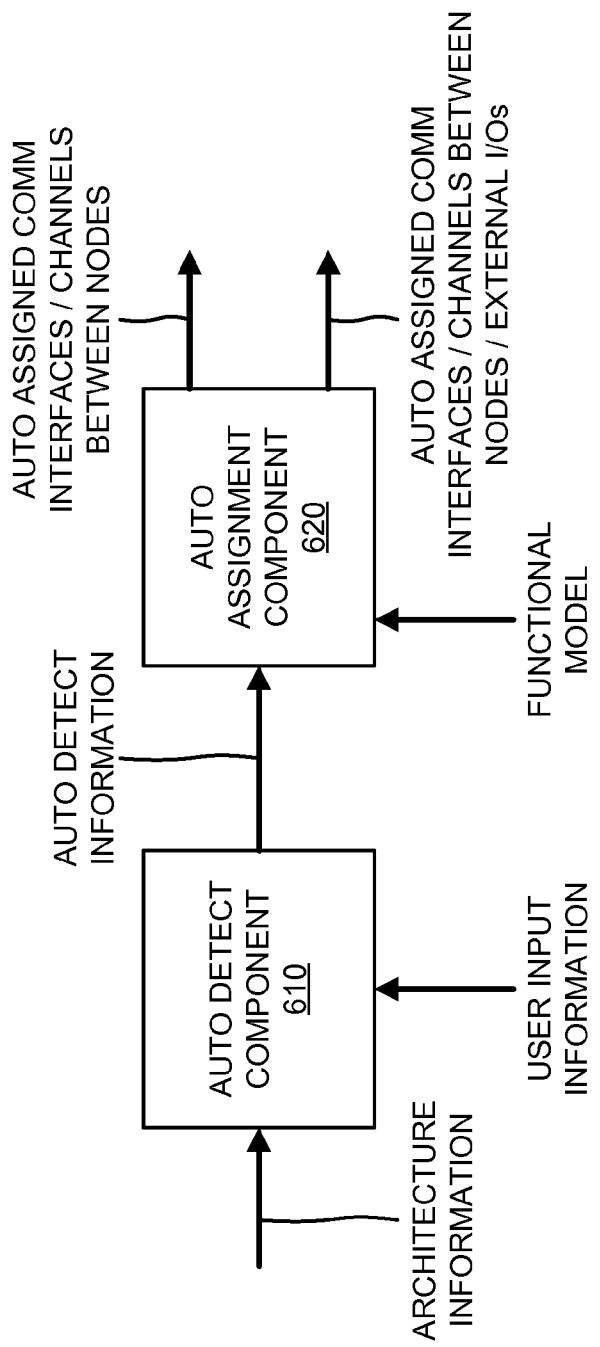
FIG. 6 is a diagram of further example functional components of the TCE.

FIG. 6 is a diagram of further example functional components of TCE 240. In one implementation, the functions described in connection with FIG. 6 may be performed by one or more components of device 300 (FIG. 3) and/or by one or more devices 300. As shown in FIG. 6, TCE 240 may include an auto detect component 610 and an auto assignment component 620.

Auto detect component 610 may include hardware or a combination of hardware and software that may receive architecture information from a target device (e.g., a hardware board) connected to client device 210 and/or server device 220. With reference to FIG. 5, the architecture information may include information about types of hardware devices 540 available for the architecture model, information about connections between first hardware device 540-1 and second hardware device 540-2, and information about connections between first and second hardware devices 540-1/540-2 and peripheral devices (e.g., external devices 570-1 and 570-2) available for the architecture model. The architecture information may also include one or more of the architecture constraint-based rules described above in connection with FIG. 5.

Auto detect component 610 may receive user input information from a user of TCE 240. The user input information may include, for example, one or more of the user constraint-based rules described above in connection with FIG. 5. Auto detect component 610 may output the architecture information and the user input information as automatically detected information, and may provide the automatically detected information to auto assignment component 620.

Auto assignment component 620 may include hardware or a combination of hardware and software that may receive the automatically detected information from auto detect component 610, and may receive the functional model (e.g., from the user of TCE 240). As described above, the functional model may include nodes and external inputs/outputs (I/Os). Based on the automatically detected information and the functional model, auto assignment component 620 may automatically assign communication interfaces and/or channels between the nodes of the functional model and between the nodes and the external inputs/outputs of the functional model.

Although FIG. 6 shows example functional components of TCE 240, in other implementations, TCE 240 may include fewer functional components, different functional components, differently arranged functional components, and/or additional functional components than those depicted in FIG. 6. Alternatively, or additionally, one or more functional components of TCE 240 may perform one or more other tasks described as being performed by one or more other functional components of TCE 240.

Visualization and Modification of Automatically Assigned Signals

Figure 7:
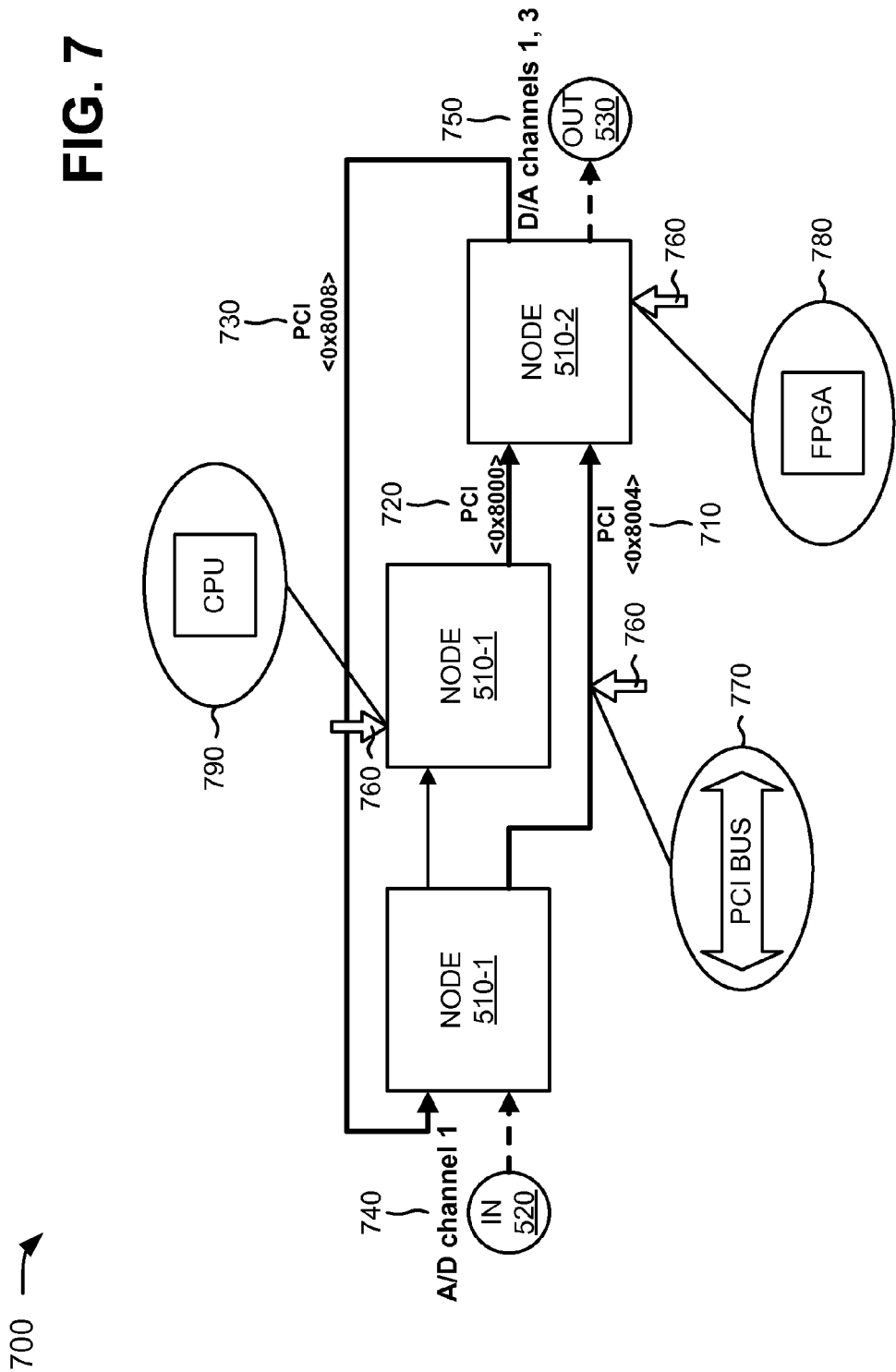
FIG. 7 is a diagram of an example user interface, for displaying signal information, that may be generated by the TCE.

FIG. 7 is a diagram of an example user interface 700, for displaying signal information, which may be generated by TCE 240 (e.g., via client device 210). User interface 700, and the user interfaces depicted in FIGS. 8 and 9 (referred to collectively herein as "user interfaces") may include graphical user interfaces (GUIs) or non-graphical user interfaces, such as text-based interfaces. The user interfaces may provide information to users of TCE 240 via customized interfaces (e.g., proprietary interfaces) and/or other types of interfaces (e.g., browser-based interfaces). The user interfaces may receive user inputs via one or more input devices, may be user configurable (e.g., a user may change the sizes of the user interfaces, information displayed in the user interfaces, color schemes used by the user interfaces, positions of text, images, icons, windows, etc., in the user interfaces, etc.), and/or may not be user configurable. The user interfaces may be displayed to a user via one or more output devices.

As shown in FIG. 7, user interface 700 may include first node 510-1, second node 510-2, external input 520, and external output 530 of the functional model. First node 510-1, second node 510-2, external input 520, and external output 530 may include the features described above in connection with, for example, FIG. 5.

As further shown in FIG. 7, the automatically assigned communication interfaces and/or channels associated with the signals of the functional model may be displayed in user interface 700 via annotations and/or via different line styles. For example, the PCI bus (e.g., communication channel 560) provided between first node 510-1 and second node 510-2 may be depicted with bolded solid lines. Alternatively, or additionally, the PCI bus provided between first node 510-1 and second node 510-2 may be depicted with annotations provided over the bolded solid lines. For example, the PCI bus may be depicted with a first annotation 710 (e.g., PCI <0x8004>), a second annotation 720 (e.g., PCI <0x8000>), and/or a third annotation 730 (e.g., PCI <0x8008>). In another example, the signals provided between first node 510-1 and external input 520 and between second node 510-2 and external output 530 may be depicted with bolded dashed lines. Alternatively, or additionally, the signals provided between first node 510-1 and external input 520 and between second node 510-2 and external output 530 may be depicted with a fourth annotation 740 (e.g., A/D channel 1) and a fifth annotation 750 (e.g., D/A channels 1, 3), respectively.

As further shown in FIG. 7, user interface 700 may provide an interactive design environment where the user may utilize a mechanism 760 (e.g., a mouse pointer) to select or hover over one of the elements of the functional model. When the user selects or hovers over one of the elements of the functional model, architecture information associated with the element may be displayed by user interface 700. For example, if the user utilizes mechanism 760 to select or hover over the signals associated with annotations 710-730, user interface 700 may display a diagram of the PCI bus automatically assigned to the signals. Alternatively, or additionally, if the user utilizes mechanism 760 to select or hover over second node 510-2, user interface 700 may display a diagram of a FPGA assigned to second node 510-2. Alternatively, or additionally, if the user utilizes mechanism 760 to select or hover over first node 510-1, user interface 700 may display a diagram of a CPU assigned to first node 510-1.

Figure 8:
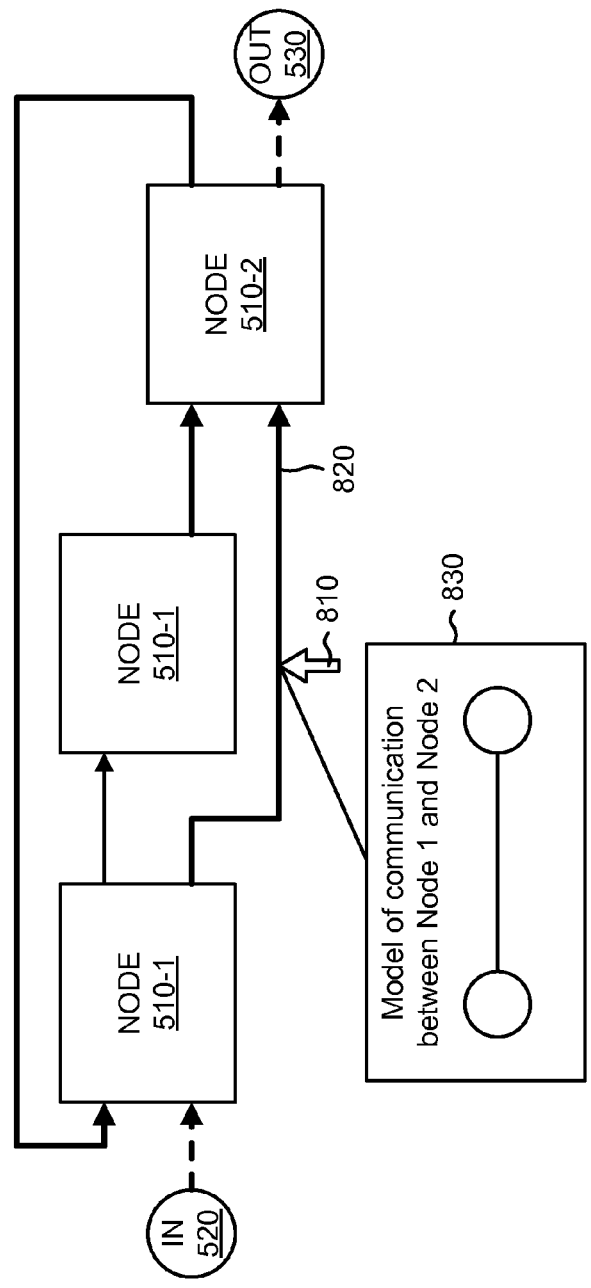
FIG. 8 is a diagram of an example user interface, for enabling modification of signals, that may be generated by the TCE.

FIG. 8 is a diagram of an example user interface 800, for enabling modification of signals, that may be generated by TCE 240. As shown in FIG. 8, user interface 800 may include first node 510-1, second node 510-2, external input 520, and external output 530 of the functional model. First node 510-1, second node 510-2, external input 520, and external output 530 may include the features described above in connection with, for example, FIG. 5.

As further shown in FIG. 8, the user may utilize a mechanism 810 (e.g., a mouse pointer) to select or hover over one of the elements of the functional model. For example, if the user utilizes mechanism 810 to select or hover over a signal 820 provided between first node 510-1 and second node 510-2, user interface 800 may display a signal model 830. The user may utilize signal model 830 to manually change communication interfaces and/or channels automatically assigned to signal 820. For example, the user may utilize signal model 830 to manually change a PCI interface to an Ethernet interface.

FIG. 9 is a diagram of another example user interface 900, for enabling modification of signals, that may be generated by TCE 740. As shown in FIG. 9, user interface 900 may include first node 510-1, second node 510-2, external input 520, and external output 530 of the functional model. First node 510-1, second node 510-2, external input 520, and external output 530 may include the features described above in connection with, for example, FIG. 5.

As further shown in FIG. 9, the user may utilize a mechanism 910 (e.g., a mouse pointer) to select or hover over one of the elements of the functional model. For example, if the user utilizes mechanism 910 to select or hover over a signal 920 provided between first node 510-1 and second node 510-2, user interface 800 may display a menu 930 of communication interfaces and/or channels that may be used for signal 920. In one example, menu 930 may provide a list (e.g., a ranked list) of the communication interfaces and/or channels that may be used for signal 920. The user may select one of the communication interfaces and/or channels from menu 930 in order to manually change the communication interfaces and/or channels automatically assigned to signal 920. For example, the user may select a Type 1 interface (I/F) from menu 930 to manually change the communication interface for signal 920. Alternatively, or additionally, the user may utilize a property of signal 920 to manually change the communication interfaces and/or channels automatically assigned to signal 920.

Although FIGS. 7-9 show example information that may be provided in user interfaces 700-900, in other implementations, user interfaces 700-900 may include less information, different information, and/or additional information than depicted in FIGS. 7-9.

Example Automatically Generated Code

As described above, based on the assignment of signals 550, TCE 240 may obtain information that is used to generate code that modifies the functional model. The generated code may modify the functional model so that the functional model takes into account the automatically assigned signals 550. In one example, the automatically generated code may modify the functional model without user interaction or input. Alternatively, or additionally, the automatically generated code may be generated by a target function library (TFL) or objects designated by a user from TCE 240. Alternatively, or additionally, a portion of the code may be automatically generated while another portion of the code may be provided by a user of TCE 240.

FIGS. 10A-10C are diagrams depicting an example 1000 of automatically generated code for automatically assigned signals in a functional model. Example 1000 may include interface code (e.g., written in the C language) of PCI device drivers when a node associated with the interface code is a processor (e.g., a CPU).

As shown in FIG. 10A, code 1010 for the functional mode may be modified so that the functional model takes into account the automatically assigned signals for the functional model. For example, code 1020 may be generated for blocks mapped to a node of the functional model, and code 1020 may be inserted in the functional model code 1010. Code 1030 for device drivers may be generated, and code 1030 may be automatically inserted in task functions of the functional model code 1010.

As shown in FIG. 10B, code 1040 for task functions of the functional model may be generated and may be automatically inserted in the functional model code 1010. Code 1050 for board setup may be generated for each node of the functional model to initialize the nodes, and code 1050 may be inserted in the functional model code 1010.

As shown in FIG. 10C, code 1060 for initialization of the device drivers may be generated, and code 1060 may be inserted in the functional model code 1010. Code 1070 for termination of the device drivers and board setup may be generated, and code 1070 may be inserted in the functional model code 1010.

FIGS. 11A-11C are diagrams depicting another example 1100 of automatically generated code for automatically assigned signals in a functional model. Example 1100 may include interface code (e.g., written in HDL, VHDL, Verilog, etc.) of a PCI interface when a node associated with the interface code is programmable logic (e.g., a FPGA, an ASIC, etc.).

As shown in FIG. 11A, code 1110 for the functional mode may be modified so that the functional model takes into account the automatically assigned signals for the functional model. For example, code 1120 may be generated for a PCI decoder, and code 1120 may be inserted in the functional model code 1110. As shown in FIG. 11B, code 1130 to generate an address in a PCI decoder source file may be generated, and code 1130 may be inserted in the functional model code 1110. As shown in FIG. 11C, code 1140 to generate further addresses in the PCI decoder source file may be generated, and code 1140 may be inserted in the functional model code 1110.

Although FIGS. 10A-11C show example information that may be included in automatically generated code for automatically assigned signals in a functional model, in other implementations, the automatically generated code may include less information, different information, and/or additional information than depicted in FIGS. 10A-11C.

FIG. 12 is a diagram 1200 depicting modification of a functional model 1210 (e.g., by TCE 240) based on automatically assigned signals and generation of code for the modified functional model. As shown in FIG. 12, functional model 1210 may include first node 510-1, second node 510-2, external input 520, and external output 530 of the functional model. First node 510-1, second node 510-2, external input 520, and external output 530 may include the features described above in connection with, for example, FIG. 5. As further shown in FIG. 12, a first signal (s1) provided between first node 510-1 and second node 510-2 may be automatically assigned to a PCI interface and/or channel. A second signal (s2) provided between first node 510-1 and second node 510-2 may also be automatically assigned to the PCI interface and/or channel. A third signal (s3) provided between first node 510-1 and second node 510-2 may be automatically assigned to an Ethernet interface and/or channel.

Once at least one of the first signal (s1), the second signal (s2), and the third signal (s3) are assigned, code generation for modifying functional model 1210, based on the assigned signals, may begin, as indicated by reference number 1220. The code generation may create a transformed model 1230 that may or may not be displayed to a user of TCE 240. If transformed model 1230 is displayed, the user may manually modify information provided by transformed model 1230. Transformed model 1230 may include first node 510-1, second node 510-2, external input 520, and external output 530. Transformed model 1230 may also include automatically assigned information such as: a PCI read block and a PCI write block for the first signal (s1); a PCI read block and a PCI write block for the second signal (s2); an Ethernet read block and an Ethernet write block for the third signal (s3); an external device (e.g., an A/D input) for external input 520; and an external device (e.g., a D/A output) for external output 530.

Once transformed model 1230 is complete, TCE 240 may automatically emit code for at least part of transformed model 1230, as indicated by reference number 1240. The emitted code for transformed model 1230 may be stored by TCE 240 as source files 1250.

Although FIG. 12 shows example information that may be included in a transformed model and automatically generated code for the transformed model, in other implementations, the transformed model and/or the automatically generated code may include less information, different information, and/or additional information than depicted in FIG. 12.

Example Process

FIGS. 13-19 are flow charts of an example process 1300 for automatically assigning signals of a functional model according to an implementation described herein. In one implementation, process 1300 may be performed by client device 210/ TCE 240. Alternatively, or additionally, process 1300 may be performed by another device or a group of devices separate from or including client device 210/TCE 240.

As shown in FIG. 13, process 1300 may include receiving information associated with a functional model (block 1310), and generating the functional model, with nodes and external inputs/outputs, based on the received information (block 1320). For example, in an implementation described above in connection with FIG. 5, a functional model may be provided (e.g., by TCE 240) and may be associated with an architecture model. TCE 240 may receive, from a user, information associated with the functional model (e.g., nodes, inputs/outputs, signals, etc.), and may generate the functional model based on the received information. In one example, the functional model may include an algorithmic model, a block diagram model, etc. produced by TCE 240. The functional model may include first node 510-1 (e.g., represented by two blocks), second node 510-2, external input 520, and external output 530.

As further shown in FIG. 13, process 1300 may include automatically detecting architecture information (block 1330), and automatically assigning signals between the nodes of the functional model based on the architecture information (block 1340). For example, in an implementation described above in connection with FIG. 5, TCE 240 may automatically detect architecture information associated with first hardware device 540-1 and second hardware device 540-2. The architecture information may include information about types of hardware devices 540 available for the architecture model, information about connections between first hardware device 540-1 and second hardware device 540-2, and information about connections between first and second hardware devices 540-1/540-2 and peripheral devices available for the architecture model. Based on the architecture information, TCE 240 may automatically assign signals 550 provided between first node 510-1 and second node 510-2.

Returning to FIG. 13, process 1300 may include automatically assigning signals between the nodes and the external inputs/outputs of the functional model based on the architecture information (block 1350), and generating a modified functional model based on the functional model and the automatically assigned signals (block 1360). For example, in an implementation described above in connection with FIG. 5, based on the architecture information, TCE 240 may automatically assign signal 550 provided between first node 510-1 and external input 520, and may automatically assign signal 550 provided between second node 510-2 and external output 530. Based on the assignment of signals 550, TCE 240 may obtain information for generating code to modify the functional model. The information may include information about the communication interfaces, the channels (e.g., communication channel 560), the peripheral devices (e.g., external devices 570-1 and 570-2), and/or the configurations of the communication interfaces, the channels, and/or the peripheral devices. TCE 240 may utilize the information about automatically generated code to modify the functional model so that the functional model takes into account the automatically assigned signals 550.

Process block 1330 may include the process blocks depicted in FIG. 14. As shown in FIG. 14, process block 1330 may include automatically detecting information about numbers and/or types of hardware devices (block 1400), automatically detecting information about connections between the hardware devices (block 1410), and automatically detecting information about connections between the hardware devices and peripherals (block 1420). For example, in an implementation described above in connection with FIG. 5, TCE 240 may automatically detect architecture information associated with first hardware device 540-1 and second hardware device 540-2. The architecture information may include information about numbers and/or types of hardware devices 540 available for the architecture model, information about connections between first hardware device 540-1 and second hardware device 540-2, and information about connections between first and second hardware devices 540-1/540-2 and peripheral devices available for the architecture model.

Figure 15:
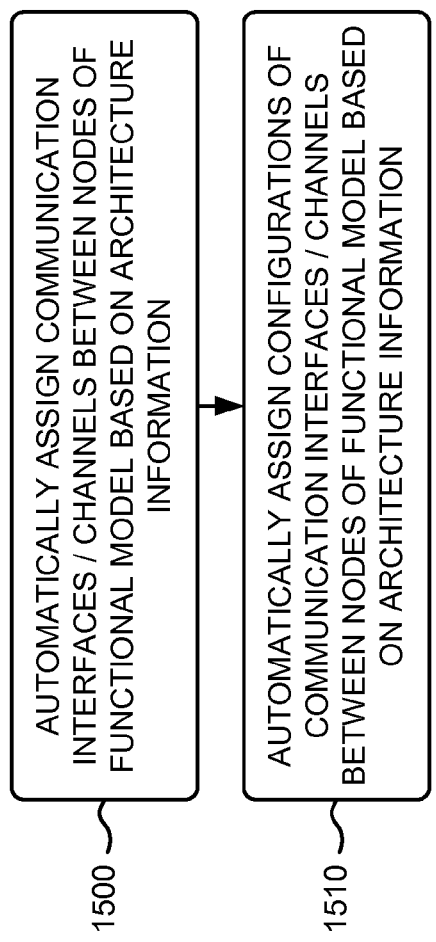

Process block 1340 may include the process blocks depicted in FIG. 15. As shown in FIG. 15, process block 1340 may include automatically assigning communication interfaces and/or channels between the nodes of the functional model based on the architecture information (block 1500), and automatically assigning configurations of the communication interfaces and/or channels between the nodes of the functional model based on the architecture information (block 1510). For example, in an implementation described above in connection with FIG. 5, TCE 240 may automatically assign signals 550, provided between first node 510-1 and second node 510-2, to particular communication interfaces (e.g., PCI interfaces) and a particular communication channel 560 (e.g., a PCI bus). A communication interface (e.g., a PCI interface) may be provided on each of first hardware device 540-1 and second hardware device 540-2. Communication channel 560 (e.g., the PCI bus) may be provided between first hardware device 540-1 and second hardware device 540-2. First hardware device 540-1 and second hardware device 540-2 may communicate with one another via the communication interfaces and communication channel 560. TCE 240 may also automatically configure properties of the communication interfaces and communication channel 560 based on the architecture information. For example, TCE 240 may allocate a PCI bus number, slot number, and address to the communication interfaces and communication channel 560.

Figure 16:
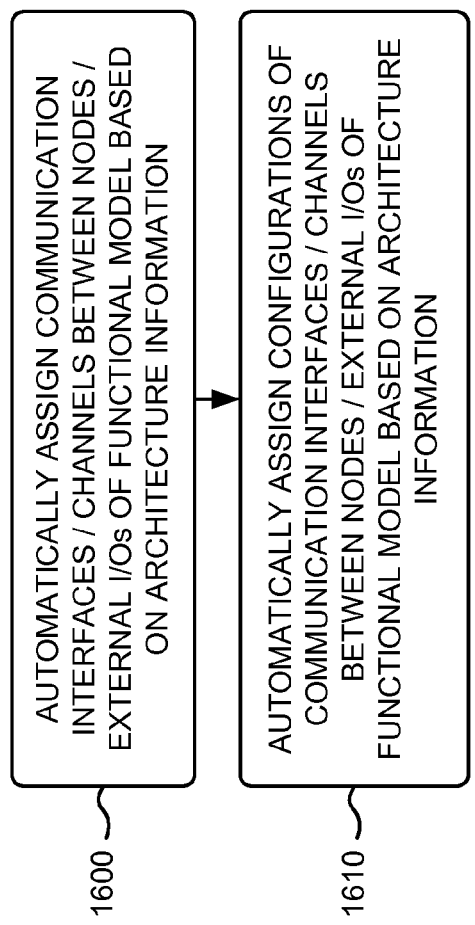

Process block 1350 may include the process blocks depicted in FIG. 16. As shown in FIG. 16, process block 1350 may include automatically assigning communication interfaces and/or channels between the nodes and the external inputs/outputs of the functional model based on the architecture information (block 1600), and automatically assigning configurations of the communication interfaces and/or channels between the nodes and the external inputs/outputs of the functional model based on the architecture information (block 1610). For example, in an implementation described above in connection with FIG. 5, TCE may automatically assign signal 550, provided between first node 510-1 and external input 520, to first external device 570-1 (e.g., an A/D input). TCE 240 may also automatically configure first external device 570-1 to communicate with first hardware device 540-1. TCE 240 may automatically assign signal 550, provided between second node 510-2 and external output 530, to second external device 570-2 (e.g., a D/A output). TCE 240 may also automatically configure second external device 570-2 to communicate with second hardware device 540-2. In one example, TCE 240 may automatically configure properties of first external device 570-1 and second external device 570-2 based on the architecture information. For example, TCE 240 may allocate a number of channels in the A/D input or the D/A output.

Figure 17:
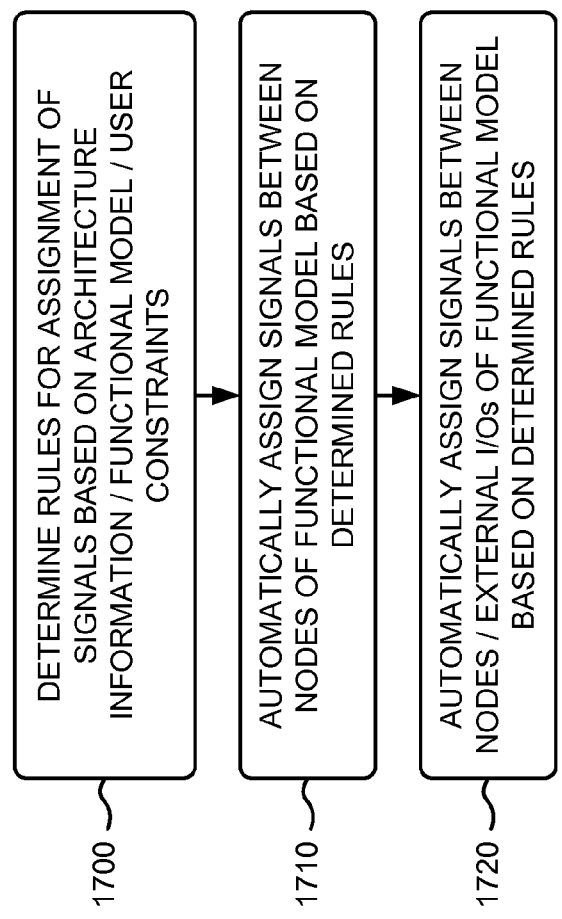

Alternatively, or additionally, process blocks 1340/1350 may include the process blocks depicted in FIG. 17. As shown in FIG. 17, process blocks 1340/1350 may include determining rules for assignment of the signals based on the architecture information, the functional model, and/or user constraints (block 1700), automatically assigning the signals between the nodes of the functional model based on the determined rules (block 1710), and automatically assigning the signals between the nodes and the external inputs/outputs of the functional model based on the determined rules (block 1720).

For example, in an implementation described above in connection with FIG. 5, TCE 240 may automatically assign signals 550 based on one or more rules. A rule may be specified by a user of TCE 240 as a user constraint and/or may be determined by the architecture model as an architecture constraint. An example of a user constraint may include a rule specifying: that signals between a first node (e.g., first node 510-1) and a second node (e.g., second node 510-2) of a functional mode should be assigned to a particular type of communication channel (e.g., a PCI bus); and that signals between the first node and a third node of the functional model should be assigned to another type of communication channel (e.g., Ethernet or another PCI bus). An example of an architecture constraint may include a rule specifying that if a data rate of a signal is too large (e.g., greater than 100 megabits), the signal should not be assigned to a particular type of communication channel (e.g., a Ethernet bus) because of exceeding the communication bandwidth of the Ethernet bus, which may result in poor overall system performance.

Figure 18:
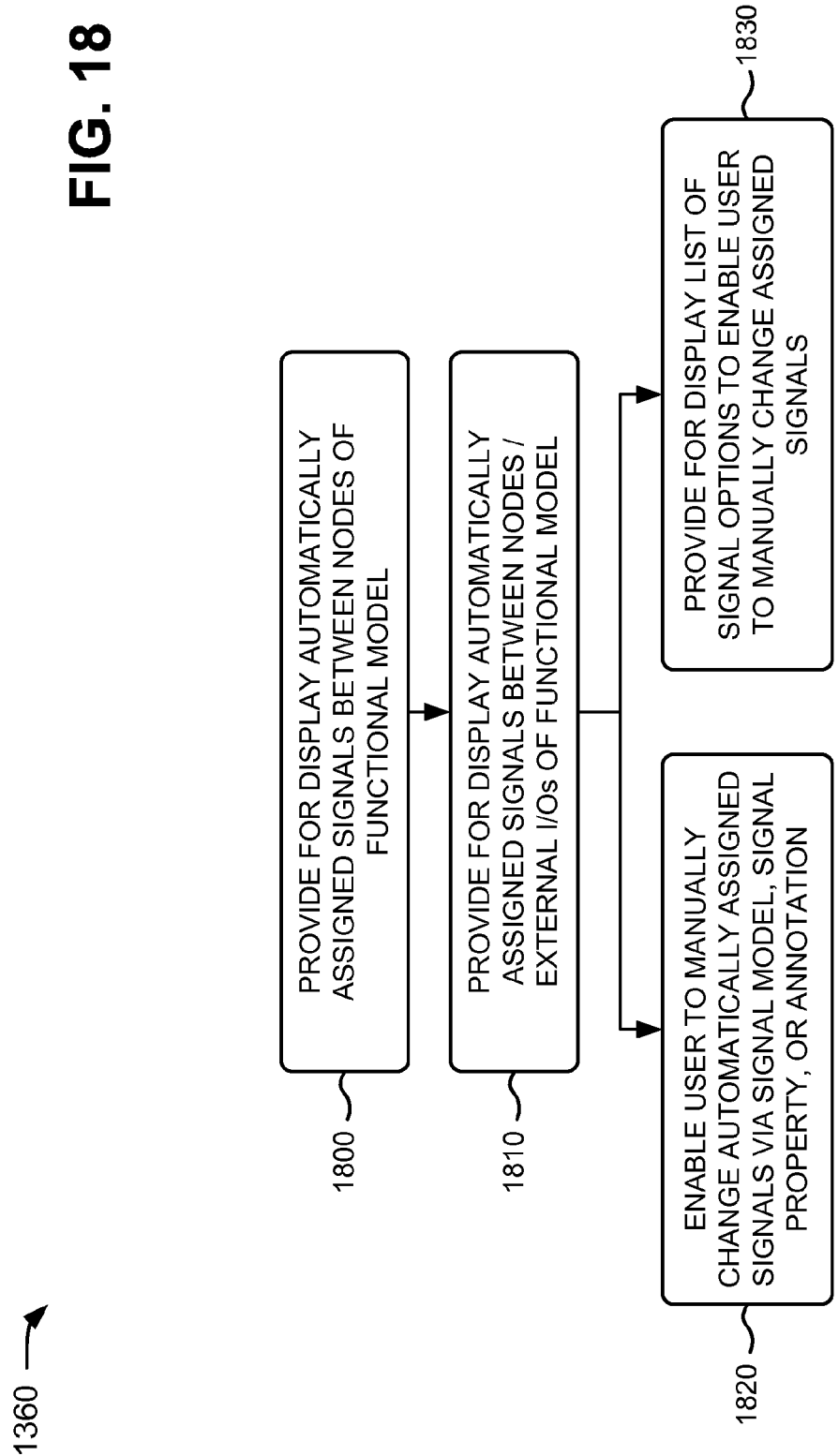

Process block 1360 may include the process blocks depicted in FIG. 18. As shown in FIG. 18, process block 1360 may include providing for display the automatically assigned signals between the nodes of the functional model (block 1800), providing for display the automatically assigned signals between the nodes and the external inputs/outputs of the functional model (block 1810), and one of: enabling a user to manually change the automatically assigned signals via signal model, a signal property, or an annotation (block 1820) or providing for display a list of signal options to enable the user to manually change the assigned signals (block 1830).

For example, in implementations described above in connection with FIGS. 8 and 9, the user may utilize mechanism 810 (e.g., a mouse pointer) to select or hover over one of the elements of the functional model. For example, if the user utilizes mechanism 810 to select or hover over signal 820 provided between first node 510-1 and second node 510-2, user interface 800 may display signal model 830. The user may utilize signal model 830 to manually change communication interfaces and/or channels automatically assigned to signal 820. The user may utilize mechanism 910 (e.g., a mouse pointer) to select or hover over one of the elements of the functional model. For example, if the user utilizes mechanism 910 to select or hover over signal 920 provided between first node 510-1 and second node 510-2, user interface 800 may display menu 930 of communication interfaces and/or channels that may be used for signal 920. In one example, menu 930 may provide a list (e.g., a ranked list) of the communication interfaces and/or channels that may be used for signal 920. The user may select one of the communication interfaces and/or channels from menu 930 in order to manually change the communication interfaces and/or channels automatically assigned to signal 920. Alternatively, or additionally, the user may utilize a property of signal 920 to manually change the communication interfaces and/or channels automatically assigned to signal 920.

Figure 19:
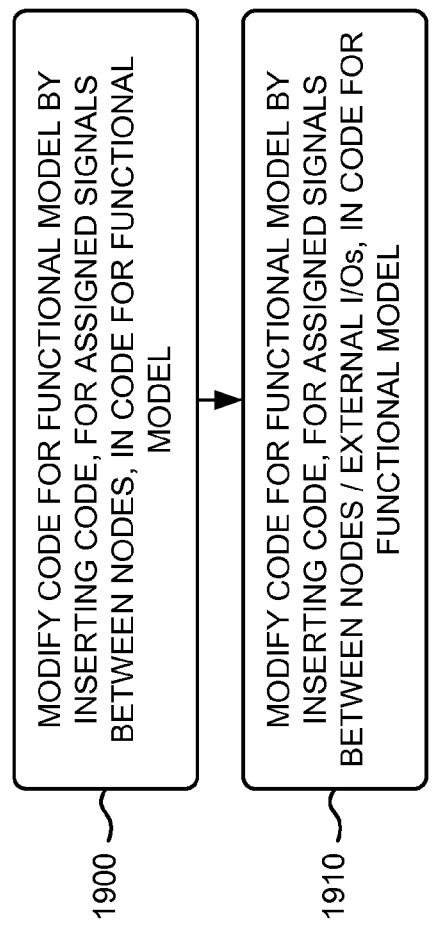

Alternatively, or additionally, process block 1360 may include the process blocks depicted in FIG. 19. As shown in FIG. 19, process block 1360 may include modifying code for the functional model by inserting code, for the assigned signals between the nodes, in the code for the functional model (block 1800), and modifying the code for the functional model by inserting code, for the assigned signals between the nodes and the external inputs/outputs, in the code for the functional model (block 1810). For example, in an implementation described above in connection with FIG. 5, TCE 240 may insert code for the automatically assigned signals 550 into the code for the functional mode, as the functional model code is being generated. In one example, TCE 240 may obtain information for generating code to modify the functional model. The information may include information about the communication interfaces, the channels (e.g., communication channel 560), the peripheral devices (e.g., external devices 570-1 and 570-2), and/or the configurations of the communication interfaces, the channels, and/or the peripheral devices. TCE 240 may utilize the information to automatically generate code that modifies the functional model so that the functional model takes into account the automatically assigned signals 550.

CONCLUSION

Systems and/or methods described herein may automatically assign signals between nodes and between nodes and external inputs/outputs of a functional model created with a TCE. The systems and/or methods may enable signals to be quickly and easily assigned so that the functional model may be deployed in an efficient manner.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 13-19, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving information associated with a functional model,
the receiving being performed by one or more computing devices;
detecting, automatically, architecture information associated with the functional model,
the detecting being performed by the one or more computing devices;
assigning, automatically and based on the architecture information, at least one signal associated with the functional model,
the at least one signal being between:
two nodes of the functional model,
a first node and an input of the functional model, or
a second node and an output of the functional model, and
the assigning being performed by the one or more computing devices; and
generating a modified functional model based on the functional model and based on assigning the at least one signal,
the generating the modified functional model being performed by the one or more computing devices.

2. The method of claim 1,
where the at least one signal is between the two nodes of the functional model, and
where assigning, automatically, the at least one signal comprises:
assigning, automatically, interfaces and channels between the two nodes of the functional model based on the architecture information; and
assigning, automatically, configurations of the interfaces and the channels between the two nodes of the functional model based on the architecture information.

3. The method of claim 1,
where the at least one signal is between the first node and the input, and
where assigning, automatically, the at least one signal comprises:
assigning, automatically, interfaces and channels between the first node and the input based on the architecture information; and
assigning, automatically, configurations of the interfaces and the channels between the first node and the input based on the architecture information.

4. The method of claim 1, where assigning, automatically, the at least one signal comprises:
determining rules for assignment of the at least one signal based on the architecture information, the functional model, and user constraints; and
assigning, automatically and based on the determined rules, the at least one signal between the two nodes of the functional model, between the first node and the input of the functional model, or between the second node and the output of the functional model.

5. The method of claim 1, further comprising:
providing, for display, the automatically assigned at least one signal between the two nodes of the functional model, the first node and the input of the functional model, or the second node and the output of the functional model; and
enabling a user to manually change the at least one signal via a signal model, a signal property, or an annotation provided for display to the user.

6. The method of claim 5, further comprising:
providing, for display, a ranked list of signal options to enable the user to manually change the at least one signal.

7. The method of claim 1, further comprising:
modifying code for the functional model by inserting code, for the at least one signal, into the code for the functional model.

8. The method of claim 1,
where assigning the at least one signal comprises:
assigning, automatically and based on the architecture information, the at least one signal to at least one of a communication interface, a channel, or a peripheral device, and
where generating the modified functional model comprises:
obtaining information regarding the at least one of the communication interface, the channel, or the peripheral device based on assigning the at least one signal, and
generating the modified functional model based on the information regarding the at least one of the communication interface, the channel, or the peripheral device.

9. The method of claim 1, where the at least one signal is between two or more of: the two nodes of the functional model, the first node and the input of the functional model, or the second node and the output of the functional model.

10. The method of claim 1, where generating the modified functional model comprises generating code that modifies the functional model.

11. The method of claim 1, further comprising:
generating the functional model.

12. A computing device, comprising:
a memory; and
a processor to:
receive information associated with a functional model,
detect architecture information associated with the functional model,
assign, based on the architecture information, at least one signal associated with the functional model,
the at least one signal being between:
two nodes of the functional model,
a first node and an input of the functional model, or
a second node and an output of the functional model, and
generate a modified functional model based on the functional model and based on assigning the at least one signal.

13. The computing device of claim 12, where the architecture information includes one or more of:
information about numbers and types of processing devices available for an architecture model, information about connections between the processing devices, or information about connections between the processing devices and peripheral devices available for the architecture model.

14. The computing device of claim 12, where the at least one signal is between the two nodes of the functional model, and where, when assigning the at least one signal, the processor is to:

assign interfaces and channels between the two nodes of the functional model based on the architecture information, and assign configurations of the interfaces and the channels between the two nodes of the functional model based on the architecture information.

15. The computing device of claim 12, where the at least one signal is between the first node and the input or the second node and the output, and where, when assigning the at least one signal between the first node and the input or the second node and the output, the processor is further to:

assign interfaces and channels between the first node and the input or between the second node and the output based on the architecture information, and assign configurations of the interfaces and the channels between the first node and the input or between the second node and the output based on the architecture information.

16. The computing device of claim 12, where, when assigning the at least one signal, the processor is to:

determine rules for assignment of the at least one signal based on the architecture information, the functional model, and user constraints, and assign, based on the determined rules, the at least one signal between the two nodes of the functional model, between the first node and the input, or between the second node and the output.

17. The computing device of claim 12, where the processor is further to:

provide, for display, the at least one signal between the two nodes of the functional model, between the first node and the input, or between the second node and the output, and enable a user to manually change the at least one signal via a signal model, a signal property, or an annotation provided for display to the user.

18. The computing device of claim 17, where the processor is further to:

provide, for display, a ranked list of signal options to enable the user to manually change the at least one signal.

19. The computing device of claim 12, where the processor is further to:

modify code for the functional model by inserting code, for the at least one signal, into the code for the functional model.

20. The computing device of claim 12, where the at least one signal is between two or more of: the two nodes of the functional model, the first node and the input of the functional model, or the second node and the output of the functional model.

21. The computing device of claim 12, where, when generating the modified functional model, the processor is to:

generate code that modifies the functional model.

22. The computing device of claim 12, where the processor is further to:

generate the functional model.

23. One or more non-transitory computer-readable media storing instructions, the instructions comprising:

one or more instructions that, when executed by a processor, cause the processor to:

automatically detect architecture information associated with a functional model, assign, based on the architecture information, at least one signal associated with the functional model, the at least one signal being between:

two blocks of the functional model, a first block and an input of the functional model, or a second block and an output of the functional model, and generate a modified functional model based on the functional model and based on assigning the at least one signal.

24. The one or more non-transitory computer-readable media of claim 23, where the architecture information includes one or more of:

information about numbers and types of processing devices available for an architecture model, information about connections between the processing devices, or information about connections between the processing devices and peripheral devices available for the architecture model.

25. The one or more non-transitory computer-readable media of claim 23, where the at least one signal is between the two blocks of the functional model, and where the one or more instructions to assign the at least one signal include:

one or more instructions that, when executed by the processor, cause the processor to:

assign interfaces and channels between the two blocks of the functional model based on the architecture information, and assign configurations of the interfaces and the channels between the two blocks of the functional model based on the architecture information.

26. The one or more non-transitory computer-readable media of claim 23, where the at least one signal is between the first block and the input or between the second block and the output, and where the one or more instructions to assign the at least one signal include:

one or more instructions that, when executed by the processor, cause the processor to:

assign interfaces and channels between the first block and the input or between the second block and the output based on the architecture information, and assign configurations of the interfaces and the channels between the first block and the input or between the second block and the output based on the architecture information.

27. The one or more non-transitory computer-readable media of claim 23, where the one or more instructions to assign the at least one signal comprise:

one or more instructions that, when executed by the processor, cause the processor to:

determine rules for assignment of the at least one signal based on the architecture information, the functional model, and user constraints, and assign, based on the determined rules, the at least one signal between the two blocks of the functional model, between the first block and the input, or between the second block and the output.

28. The one or more non-transitory computer-readable media of claim 23, where the instructions further comprise:
one or more instructions that, when executed by the processor, cause the processor to:
provide, for display, the at least one signal between the two blocks of the functional model, between the first block and the input or between the second block and the output, and
enable a user to manually change the at least one signal via a signal model, a signal property, or an annotation provided for display to the user.

29. The one or more non-transitory computer-readable media of claim 28, where the instructions further comprise:
one or more instructions that, when executed by the processor, cause the processor to:
provide, for display, a ranked list of signal options to enable the user to manually change the at least one signal.

30. The one or more non-transitory computer-readable media of claim 23, where the instructions further comprise:
one or more instructions that, when executed by the processor, cause the processor to:
modify code for the functional model by inserting code, for the at least one signal, into the code for the functional model.

31. The one or more non-transitory computer-readable media of claim 23, where the architecture model comprises:
a homogeneous architecture model that includes processing devices of a same type, or
a heterogeneous architecture model that includes processing devices of different types.

32. The one or more non-transitory computer-readable media of claim 23, where the at least one signal is between two or more of: the two blocks of the functional model, the first block and the input of the functional model, or the second block and the output of the functional model.

33. The one or more non-transitory computer-readable media of claim 23, where the one or more instructions to generate the modified functional model comprise:
one or more instructions that, when executed by the processor, cause the processor to:
generate code that modifies the functional model.

34. The one or more non-transitory computer-readable media of claim 23, where the instructions further comprise:
one or more instructions that, when executed by the processor, cause the processor to:
generate the functional model.

35. A method comprising:
obtaining information associated with a model,
the obtaining the information associated with the model being performed by a computing device;
obtaining architecture information associated with a target device that is to execute the model,
the obtaining the architecture information being performed by the computing device;
assigning, based on the architecture information, a signal between two elements of the model,
the assigning the signal being performed by the computing device; and
modifying the model based on assigning the signal between the two elements,
the modifying the model being performed by the computing device.

36. The method of claim 35, where obtaining the architecture information includes:
obtaining information identifying types of hardware devices provided by the target device.

37. The method of claim 35, where obtaining the architecture information includes:
obtaining information associated with a connection between two hardware devices provided by the target device.

38. The method of claim 35, where obtaining the architecture information includes:
obtaining information identifying types of communication interfaces provided by the target device.

39. The method of claim 35, where obtaining the architecture information includes:
obtaining information associated with a connection between the target device and a peripheral device.

40. The method of claim 35, where obtaining the architecture information includes:
obtaining an address of a memory mapped device.

41. The method of claim 35, where the two elements include one or more of:
an input of the model, or
an output of the model.

42. The method of claim 35, where the signal is between two or more of:
the two elements of the model,
a first element, of the two elements, and an input of the model, or
a second element, of the two elements, and an output of the model.

43. The method of claim 35, where modifying the model comprises generating code that modifies the model.

44. The method of claim 35, further comprising:
generating the model.

* * * * *

UNITED STATES PATENT AND TRADEMARK OFFICE
CERTIFICATE OF CORRECTION

| | | |
|---|---|---|
| PATENT NO. | : 9,064,075 B1 | Page 1 of 1 |
| APPLICATION NO. | : 13/489181 | |
| DATED | : June 23, 2015 | |
| INVENTOR(S) | : Katalin M. Popovici et al. | |

It is certified that error appears in the above-identified patent and that said Letters Patent is hereby corrected as shown below:

Claims

Please correct Claim 31 as follows:

Column 25, line 29, after "claim 23," insert --where the architecture information is obtained from an architecture model, and--.

Signed and Sealed this
Seventeenth Day of November, 2015

Michelle K. Lee
*Director of the United States Patent and Trademark Office*